US012586393B2

(12) United States Patent
Francis et al.

(10) Patent No.: US 12,586,393 B2
(45) Date of Patent: Mar. 24, 2026

(54) KNOWLEDGE-DRIVEN SCENE PRIORS FOR SEMANTIC AUDIO-VISUAL EMBODIED NAVIGATION

(71) Applicants:Robert Bosch GmbH, Stuttgart (DE); Carnegie Mellon University, Pittsburgh, PA (US)

(72) Inventors: Jonathan Francis, Pittsburgh, PA (US); Luca Bondi, Pittsburgh, PA (US); Gyan Tatiya, Medford, MA (US); Ingrid Navarro, Pittsburgh, PA (US)

(73) Assignees: Robert Bosch GmbH (DE); Carnegie Mellon University, Pittsburgh, PA (US)

( * ) Notice: Subject to any disclaimer, the term of this patent is extended or adjusted under 35 U.S.C. 154(b) by 332 days.

(21) Appl. No.: 18/222,090

(22) Filed: Jul. 14, 2023

(65) Prior Publication Data

US 2025/0022296 A1     Jan. 16, 2025

(51) Int. Cl.
| | |
|---|---|
| *G06V 20/70* | (2022.01) |
| *G06F 40/30* | (2020.01) |
| *G06V 10/77* | (2022.01) |
| *G06V 10/80* | (2022.01) |
| *G06V 10/82* | (2022.01) |

(52) U.S. Cl.
CPC .............. *G06V 20/70* (2022.01); *G06F 40/30* (2020.01); *G06V 10/7715* (2022.01); *G06V 10/811* (2022.01); *G06V 10/82* (2022.01)

(58) Field of Classification Search
CPC .................................. G06V 20/70; G06F 40/30
See application file for complete search history.

(56) References Cited

U.S. PATENT DOCUMENTS

| | | | | |
|---|---|---|---|---|
| 9,774,976 | B1 * | 9/2017 | Baumgarte | ............. H04S 7/302 |
| 9,900,723 | B1 * | 2/2018 | Choisel | ................... H04S 7/305 |

(Continued)

FOREIGN PATENT DOCUMENTS

| | | |
|---|---|---|
| CN | 113497914 A | 10/2021 |
| EP | 3540634 A1 | 9/2019 |

OTHER PUBLICATIONS

Tatiya et al., Knowledge-driven Scene Priors for Semantic Audio-Visual Embodied Navigation, Sep. 28, 2021 (Year: 2021).*

(Continued)

*Primary Examiner* — Kevin Ky

(74) *Attorney, Agent, or Firm* — Dickinson Wright PLLC

(57)     ABSTRACT

A method of controlling navigation of a device in an environment using machine learning (ML) models includes receiving visual and audio observation data of the environment as sensed by the device, determining classification scores for objects and regions in the environment based on the visual and audio observation data, encoding visual information based on the classification scores, determining audio-semantic feature embeddings based at least in part on the classification scores, the audio-semantic feature embeddings indicating spatial relationships between objects in the environment, between regions in the environment, and between objects and regions in the environment, and determining and outputting, based on the encoded visual information and the audio-semantic feature embeddings, a state representation corresponding to a state of the device within the environment.

16 Claims, 13 Drawing Sheets

(56) References Cited

U.S. PATENT DOCUMENTS

| 10,878,837 | B1 * | 12/2020 | Guo | G06N 3/044 |
|---|---|---|---|---|
| 10,902,616 | B2 * | 1/2021 | Brown | G06V 20/49 |
| 11,246,002 | B1 * | 2/2022 | Donley | H04R 1/406 |
| 11,709,068 | B2 * | 7/2023 | Sommer | H04W 4/029 |
| | | | | 701/433 |
| 12,373,688 | B2 * | 7/2025 | So | G06N 3/0455 |
| 2016/0021481 | A1 * | 1/2016 | Johnson | H04R 5/04 |
| | | | | 381/303 |
| 2016/0150343 | A1 * | 5/2016 | Wang | H04S 3/002 |
| | | | | 381/103 |
| 2017/0105080 | A1 * | 4/2017 | Das | G10L 25/51 |
| 2018/0262856 | A1 * | 9/2018 | Wang | H04S 5/005 |
| 2025/0022296 | A1 * | 1/2025 | Francis | G06V 10/82 |
| 2025/0246176 | A1 * | 7/2025 | Nir | G10L 13/02 |

OTHER PUBLICATIONS

International Search Report and Written Opinion for PCT/US2024/038096, Dated Oct. 30, 2024, 10 Pages.

Gyan Tatiya et al., "Knowledge-Driven Scene Priors for Semantic Audio-Visual Embodied Navigation" arXiv:2212.11345v1 [cs.RO] Dec. 21, 2022, 19 Pages.

Changan Chen et al., "Semantic Audio-Visual Navigation." arXiv:2012.11583v2 [cs.CV] Apr. 7, 2021, 12 Pages.

Chuang Gan et al., "Look, Listen, and Act: Towards Audio-Visual Embodied Navigation." arXiv: 1912.11684v2 [cs.CV] Mar. 8, 2020, 7 Pages.

Dhruv Batra, Aaron Gokaslan, Aniruddha Kembhavi, Oleksandr Maksymets, Roozbeh Mottaghi, Manolis Savva, Alexander Toshev, and Erik Wijmans. ObjectNav Revisited: On Evaluation of Embodied Agents Navigating to Objects. In arXiv:2006.13171, 2020.

Angel X. Chang, Angela Dai, Thomas A. Funkhouser, Maciej Halber, Matthias Nießner, Manolis Savva, Shuran Song, Andy Zeng, and Yinda Zhang. Matterport3d: Learning from RGB-D data in indoor environments. In 2017 International Conference on 3D Vision, 3DV 2017, Qingdao, China, Oct. 10-12, 2017, pp. 667-676. IEEE Computer Society, 2017. doi: 10.1109/3DV.2017.00081. URL https://doi.org/10.1109/ 3DV.2017.00081.

Devendra Singh Chaplot, Dhiraj Gandhi, Abhinav Gupta, and Russ R. Salakhutdinov. Object goal naviga-tion using goal oriented semantic exploration. In Hugo Larochelle, Marc'Aurelio Ranzato, Raia Had-sell, Maria-Florina Balcan, and Hsuan-Tien Lin (eds.), Advances in Neural Information Processing Sys-tems 33: Annual Conference on Neural Information Processing Systems 2020, NeurIPS 2020, Dec. 6-12, 2020, virtual, 2020a. URL https://proceedings.neurips.cc/paper/2020/hash/2c75cf2681788adaca63aa95ae028b22-Abstract.html.

Devendra Singh Chaplot, Dhiraj Gandhi, Saurabh Gupta, Abhinav Gupta, and Ruslan Salakhutdinov. Learning to explore using active neural slam. arXiv preprint arXiv:2004.05155, 2020b.

Devendra Singh Chaplot, Ruslan Salakhutdinov, Abhinav Gupta, and Saurabh Gupta. Neural topological SLAM for visual navigation. In 2020 IEEE/CVF Conference on Computer Vision and Pattern Recognition, CVPR 2020, Seattle, WA, USA, Jun. 13-19, 2020, pp. 12872-12881. Computer Vision Foundation/IEEE, 2020c. doi: 10.1109/CVPR42600.2020.01289. URL https://openaccess.thecvf.com/content_CVPR_2020/html/Chaplot_Neural_Topological_SLAM_for_Visual_Navigation_ CVPR_2020_paper.html.

Changan Chen, Ziad Al-Halah, and Kristen Grauman. Semantic audio-visual navigation. In IEEE Conference on Computer Vision and Pattern Recognition, CVPR 2021, virtual, Jun. 19-25, 2021, pp. 15516-15525. Computer Vision Foundation / IEEE, 2021a. URL https://openaccess.thecvf. com/content/CVPR2021/html/Chen_Semantic_Audio-Visual_Navigation_CVPR_ 2021_paper.html.

Changan Chen, Sagnik Majumder, Ziad Al-Halah, Ruohan Gao, Santhosh Kumar Ramakrishnan, and Kristen Grauman. Learning to set waypoints for audio-visual navigation. In 9th International Conference on Learning Representations, ICLR 2021, Virtual Event, Austria, May 3-7, 2021. OpenReview.net, 2021b. URL https://openreview.net/forum?id=cR91FAodFMe.

Heming Du, Xin Yu, and L. Zheng. Learning object relation graph and tentative policy for visual navigation. ArXiv, abs/2007.11018, 2020.

Kuan Fang, Alexander Toshev, Li Fei-Fei, and Silvio Savarese. Scene memory transformer for embodied agents in long-horizon tasks. In IEEE Conference on Computer Vision and Pattern Recognition, CVPR 2019, Long Beach, CA, USA, Jun. 16-20, 2019, pp. 538-547. Computer Vision Foundation / IEEE, 2019. doi: 10.1109/CVPR.2019.00063. URL http:/openaccess.thecvf.com/content_CVPR_2019/html/Fang_Scene_Memory_Transformer_for_Embodied_Agents_in_Long-Horizon_Tasks_CVPR_2019_paper.html.

Jonathan Francis, Nariaki Kitamura, Felix Labelle, Xiaopeng Lu, Ingrid Navarro, and Jean Oh. Core challenges in embodied vision-language planning. Journal of Artificial Intelligence Research, 74:459-515, 2022.

Chuang Gan, Yiwei Zhang, Jiajun Wu, Boqing Gong, and Joshua B Tenenbaum. Look, listen, and act: Towards audio-visual embodied navigation. In 2020 IEEE International Conference on Robotics and Automation (ICRA), pp. 9701-9707. IEEE, 2020.

Daniel Gordon, Dieter Fox, and Ali Farhadi. What should I do now? marrying reinforcement learning and symbolic planning. CoRR, abs/1901.01492, 2019. URL http://arxiv.org/abs/1901.01492.

Kaiming He, Xiangyu Zhang, Shaoqing Ren, and Jian Sun. Deep residual learning for image recognition. CoRR, abs/1512.03385, 2015. URL http://arxiv.org/abs/1512.03385.

Muhammad Zubair Irshad, Chih-Yao Ma, and Zsolt Kira. Hierarchical cross-modal agent for robotics vision-and-language navigation. CoRR, abs/2104.10674, 2021. URL https://arxiv.org/abs/2104.10674.

Lydia E. Kavraki, Petr Svestka, Jean-Claude Latombe, and Mark H. Overmars. Probabilistic roadmaps for path planning in high-dimensional configuration spaces. IEEE Trans. Robotics Autom., 12(4):566-580, 1996. doi: 10.1109/70.508439. URL https://doi.org/10.1109/70.508439.

Diederik P. Kingma and Jimmy Ba. Adam: A method for stochastic optimization. In Yoshua Bengio and Yann LeCun (eds.), 3rd International Conference on Learning Representations, ICLR 2015, San Diego, CA, USA, May 7-9, 2015, Conference Track Proceedings, 2015. URL http://arxiv.org/abs/1412.6980.

Thomas N. Kipf and Max Welling. Semi-supervised classification with graph convolutional networks. In 5th International Conference on Learning Representations, ICLR 2017, Toulon, France, Apr. 24-26, 2017, Conference Track Proceedings. OpenReview.net, 2017. URL https://openreview.net/forum? id=SJU4ayYgl.

C. Knapp and G. Carter. The generalized correlation method for estimation of time delay. IEEE Transactions on Acoustics, Speech, and Signal Processing, 24(4):320-327, 1976. doi: 10.1109/TASSP.1976.1162830.

Sven Koenig and Maxim Likhachev. Real-time adaptive a *_ In Hideyuki Nakashima, Michael P. Wellman, Gerhard Weiss, and Peter Stone (eds.), 5th International Joint Conference on Autonomous Agents and Multiagent Systems (AAMAS 2006), Hakodate, Japan, May 8-12, 2006, pp. 281-288. ACM, 2006. doi: 10.1145/1160633.1160682. URL https://doi.org/10.1145/1160633.1160682.

Eric Kolve, Roozbeh Mottaghi, Daniel Gordon, Yuke Zhu, Abhinav Gupta, and Ali Farhadi. AI2-THOR: an interactive 3d environment for visual AI. CoRR, abs/1712.05474, 2017. URL http://arxiv.org/abs/ 1712.05474.

Jacob Krantz, Erik Wijmans, Arjun Majundar, Dhruv Batra, and Stefan Lee. Beyond the nav-graph: Vision and language navigation in continuous environments. In European Conference on Computer Vision (ECCV), 2020.

Ranjay Krishna, Yuke Zhu, Oliver Groth, Justin Johnson, Kenji Hata, Joshua Kravitz, Stephanie Chen, Yannis Kalantidis, Li-Jia Li, David A. Shamma, Michael S. Bernstein, and Fei-Fei Li. Visual genome: Connecting language and vision using crowdsourced dense image annotations, 2016.

Steven M. Lavalle, James J. Kuffner, and Jr. Rapidly-exploring random trees: Progress and prospects. In Algorithmic and Computational Robotics: New Directions, pp. 293-308, 2000.

(56) References Cited

OTHER PUBLICATIONS

Yunlian Lv, Ning Xie, Yimin Shi, Zijiao Wang, and Heng Tao Shen. Improving target-driven visual navigation with attention on 3d spatial relationships, 2020.

Kaixin Ma, Jonathan Francis, Quanyang Lu, Eric Nyberg, and Alessandro Oltramari. Towards generalizable neuro-symbolic systems for commonsense question answering. In Proceedings of the First Workshop on Commonsense Inference in Natural Language Processing, pp. 22-32, 2019.

Kaixin Ma, Filip Ilievski, Jonathan Francis, Yonatan Bisk, Eric Nyberg, and Alessandro Oltramari. Knowledge-driven data construction for zero-shot evaluation in commonsense question answering. In Proceedings of the AAAI Conference on Artificial Intelligence, vol. 35, pp. 13507-13515, 2021.

Mahdi Kazemi Moghaddam, Qi Wu, Ehsan Abbasnejad, and Javen Qinfeng Shi. Optimistic agent: Accurate graph-based value estimation for more successful visual navigation, 2020.

Alessandro Oltramari, Jonathan Francis, Cory Henson, Kaixin Ma, and Ruwan Wickramarachchi. Neurosymbolic architectures for context understanding. In Knowledge Graphs for eXplainable Artificial Intelligence: Foundations, Applications and Challenges, pp. 143-160. IOS Press, 2020.

Adam Paszke, Sam Gross, Francisco Massa, Adam Lerer, James Bradbury, Gregory Chanan, Trevor Killeen, Zeming Lin, Natalia Gimelshein, Luca Antiga, Alban Desmaison, Andreas Köpf, Edward Yang, Zach DeVito, Martin Raison, Alykhan Tejani, Sasank Chilamkurthy, Benoit Steiner, Lu Fang, Junjie Bai, and Soumith Chintala. Pytorch: An imperative style, high-performance deep learning library. CoRR, abs/1912.01703, 2019. URL http://arxiv.org/abs/1912.01703.

Jeffrey Pennington, Richard Socher, and Christopher Manning. GloVe: Global vectors for word representation. In Proceedings of the 2014 Conference on Empirical Methods in Natural Language Processing (EMNLP), pp. 1532-1543, Doha, Qatar, Oct. 2014. Association for Computational Linguistics. doi: 10.3115/v1/D14-1.162. URL https://aclanthology.org/D14-1162.

Yiding Qiu, Anwesan Pal, and Henrik I. Christensen. Learning hierarchical relationships for object-goal navigation, 2020.

Homagni Saha, Fateme Fotouhif, Qisai Liu, and Soumik Sarkar. A modular vision language navigation and manipulation framework for long horizon compositional tasks in indoor environment. CoRR, abs/2101.07891, 2021. URL https://arxiv.org/abs/2101.07891.

John Schulman, Filip Wolski, Prafulla Dhariwal, Alec Radford, and Oleg Klimov. Proximal policy optimization algorithms. CoRR, abs/1707.06347, 2017. URL http://arxiv.org/abs/1707.06347.

Robyn Speer, Joshua Chin, and Catherine Havasi. Conceptnet 5.5: An open multilingual graph of general knowledge. In Proc. of AAAI, AAAI'17, pp. 4444-4451, 2017.

Joshua B Tenenbaum, Vin De Silva, and John C Langford. A global geometric framework for nonlinear dimensionality reduction. science, 290(5500):2319-2323, 2000.

Varun Kumar Vijay, Abhinav Ganesh, Hanlin Tang, and Arjun Bansal. Generalization to novel objects using prior relational knowledge, 2019.

Erik Wijmans, Abhishek Kadian, Ari Morcos, Stefan Lee, Irfan Essa, Devi Parikh, Manolis Savva, and Dhruv Batra. DD-PPO: learning near-perfect pointgoal navigators from 2.5 billion frames. In 8th International Conference on Learning Representations, ICLR 2020, Addis Ababa, Ethiopia, Apr. 26-30, 2020. OpenReview.net, 2020. URL https://openreview.net/forum?id=H1gX8C4YPr.

Zonghan Wu, Shirui Pan, Fengwen Chen, Guodong Long, Chengqi Zhang, and Philip S. Yu. A comprehensive survey on graph neural networks. IEEE Transactions on Neural Networks and Learning Systems, 32(1):4-24, Jan. 2021. ISSN 2162-2388. doi: 10.1109/tnnls.2020.2978386. URL http://dx.doi.org/10.1109/TNNLS.2020.2978386.

Wei Yang, X. Wang, Ali Farhadi, Abhinav Gupta, and Roozbeh Mottaghi. Visual semantic navigation using scene priors. In International Conference on Learning Representations (ICLR), New Orleans, LA, USA, 2019. OpenReview.net. URL https://openreview.net/forum?id=HJeRkh05Km.13.

* cited by examiner

200

202

204

220 — I/O → 206

CPU

HMI — 218

222 — Network → Display — 232

208 — Memory

ML Model — 210

Training Data — 212

Raw Source — 216

230

224

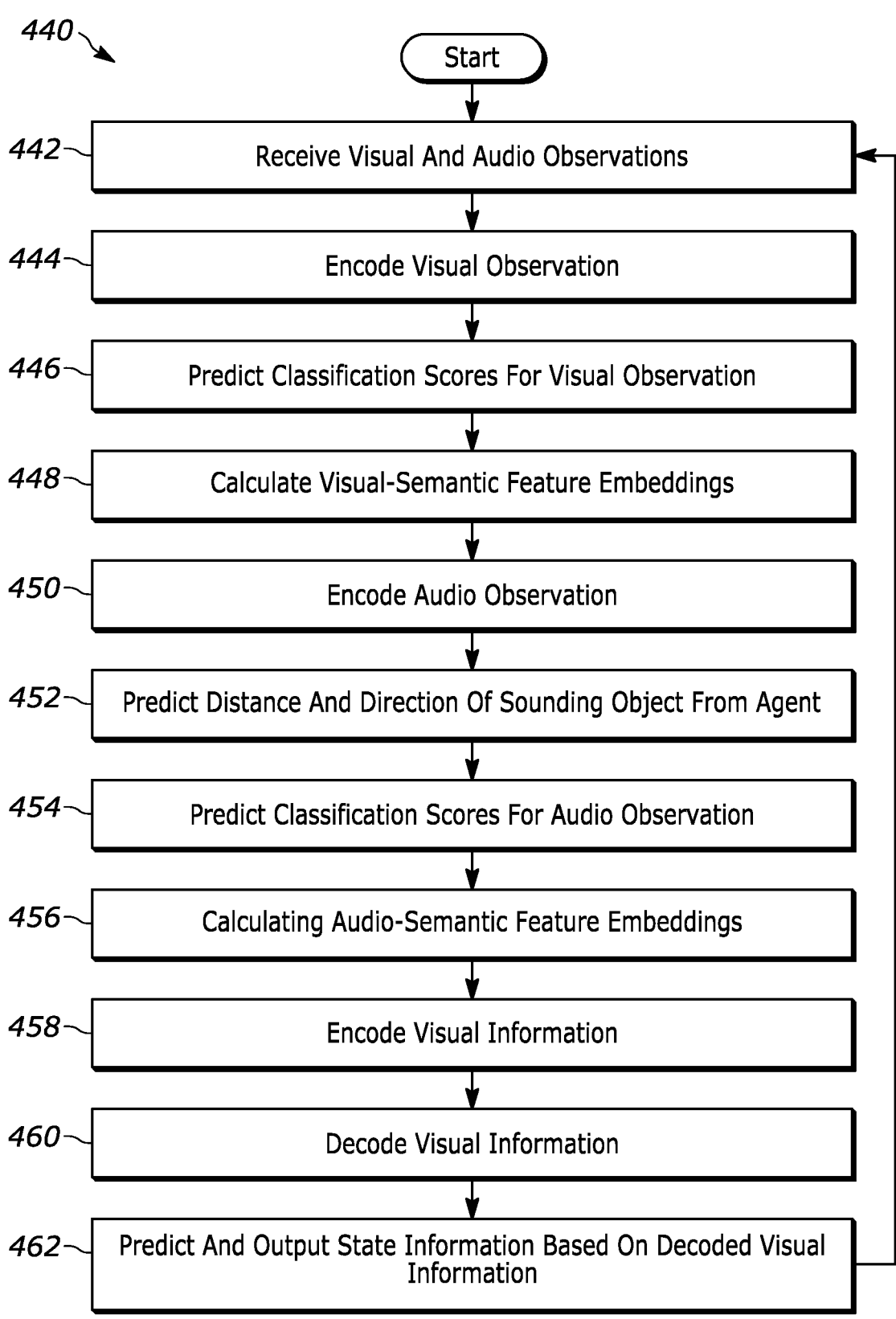

440

Start

442 — Receive Visual And Audio Observations

444 — Encode Visual Observation

446 — Predict Classification Scores For Visual Observation

448 — Calculate Visual-Semantic Feature Embeddings

450 — Encode Audio Observation

452 — Predict Distance And Direction Of Sounding Object From Agent

454 — Predict Classification Scores For Audio Observation

456 — Calculating Audio-Semantic Feature Embeddings

458 — Encode Visual Information

460 — Decode Visual Information

462 — Predict And Output State Information Based On Decoded Visual Information

KNOWLEDGE-DRIVEN SCENE PRIORS FOR SEMANTIC AUDIO-VISUAL EMBODIED NAVIGATION

TECHNICAL FIELD

The present disclosure relates to semantic audio-visual navigation (SAVi), and more particularly to systems and methods that incorporate knowledge-driven scene priors into SAVi.

BACKGROUND

In semantic audio-visual navigation (SAVi) systems, a device (sometimes referred to as an "agent") may be configured to autonomously navigate to and/or around objects in an environment (a "scene") based on audio and visual inputs. More specifically, the device is configured to navigate based on associations between audio and visual inputs and semantic labels assigned to those inputs.

SUMMARY

A method of controlling navigation of a device in an environment using machine learning (ML) models includes receiving visual and audio observation data of the environment as sensed by the device, determining classification scores for objects and regions in the environment based on the visual and audio observation data, encoding visual information based on the classification scores, determining audio-semantic feature embeddings based at least in part on the classification scores, the audio-semantic feature embeddings indicating spatial relationships between objects in the environment, between regions in the environment, and between objects and regions in the environment, and determining and outputting, based on the encoded visual information and the audio-semantic feature embeddings, a state representation corresponding to a state of the device within the environment.

In other features, determining the audio-semantic feature embeddings includes determining the audio-semantic feature embeddings using a first graph encoder network. The first graph encoder network determines the audio-semantic feature embeddings using a first knowledge graph, and vertices in the first knowledge graph correspond to objects or regions in the environment and edges between respective pairs of vertices correspond to relationships between the respective pairs of vertices. The method further includes determining visual-semantic feature embeddings based at least in part on the classification scores. Determining the visual-semantic feature embeddings further indicate spatial relationships between objects in the environment, between regions in the environment, and between objects and regions in the environment. Determining the visual-semantic feature embeddings includes determining the visual-semantic feature embeddings using a second graph encoder network. The method further includes encoding the visual information based on an output of the second graph encoder network and an output of an audio encoder.

In other features, the method further includes determining a distance and direction of a sounding object from the device based on the audio observation. Determining the audio-semantic feature embeddings includes determining the audio-semantic feature embeddings further based on the determined distance and direction of the sounding object from the device. Determining the classification scores for objects and regions in the environment based on the visual and audio observation data includes determining visual classification scores using a pre-trained vision model and determining audio classification scores using a pre-trained audio model. The method further includes providing, during training of the ML model, visual and audio data corresponding to previously seen indoor environments and previously heard sounds, previously seen indoor environments and unheard sounds, unseen houses and previously heard sounds, and unseen houses and unheard sounds.

A system for controlling navigation of a device in an environment using machine learning (ML) models includes sensors configured to receive visual and audio observation data of the environment, a vision network configured to determine visual classification scores for objects and regions in the environment based on the visual observation data, an audio network configured to determine audio classification scores for objects and regions in the environment based on the audio observation data and determine audio-semantic feature embeddings based at least in part on the visual classification scores, the audio-semantic feature embeddings indicating spatial relationships between objects in the environment, between regions in the environment, and between objects and regions in the environment, and a policy network configured to encode visual information based on the visual classification scores and determine and output, based on the encoded visual information and the audio-semantic feature embeddings, a state representation corresponding to a state of the device within the environment.

In other features, the audio network includes a first graph encoder network configured to determine the audio-semantic feature embeddings using a first knowledge graph. Vertices in the first knowledge graph correspond to objects or regions in the environment and edges between respective pairs of vertices correspond to relationships between the respective pairs of vertices. The vision network includes a second graph encoder network configured to determine visual-semantic feature embeddings based at least in part on the visual classification scores, and the policy network includes an encoder configured to encode the visual information based on an output of the second graph encoder network and an output of an audio encoder. The system further includes a location predictor configured to determine a distance and direction of a sounding object from the device based on the audio observation. The audio network is configured to determine the audio-semantic feature embeddings further based on the determined distance and direction of the sounding object from the device. The vision network and the audio network are configured to respectively implement a pre-trained vision model and a pre-trained audio model to determine the visual and audio classification scores, and the pre-trained vision model and the pre-trained audio model are configured to receive, during training, visual and audio data corresponding to previously seen indoor environments and previously heard sounds, previously seen indoor environments and unheard sounds, unseen houses and previously heard sounds, and unseen houses and unheard sounds.

A computing device configured to control navigation of a device in an environment using machine learning (ML) models, the computing device including a processing device configured to execute instructions stored in memory to receive visual and audio observation data of the environment as sensed by the device, determine classification scores for objects and regions in the environment based on the visual and audio observation data, encode visual information based on the classification scores, determine audio-semantic feature embeddings based at least in part on the classification scores, the audio-semantic feature embeddings indicating spatial relationships between objects in the environment, between regions in the environment, and between objects and regions in the environment, and determine and output, based on the encoded visual information and the audio-semantic feature embeddings, a state representation corresponding to a state of the device within the environment.

In other features, the processing device is further configured to execute the instructions to determine the audio-semantic feature embeddings using a first graph encoder network that includes a first knowledge graph, and vertices in the first knowledge graph correspond to objects or regions in the environment and edges between respective pairs of vertices correspond to relationships between the respective pairs of vertices. The processing device is further configured to execute the instructions to determine visual-semantic feature embeddings using a second graph encoder network and encode the visual information based on an output of the second graph encoder network and an output of an audio encoder. The processing device is further configured to determine a distance and direction of a sounding object from the device based on the audio observation and determine the audio-semantic feature embeddings further based on the determined distance and direction of the sounding object from the device. The processing device is further configured to implement a pre-trained vision model and a pre-trained audio model to determine visual and audio classification scores, and the pre-trained vision model and the pre-trained audio model receive, during training, visual and audio data corresponding to previously seen indoor environments and previously heard sounds, previously seen indoor environments and unheard sounds, unseen houses and previously heard sounds, and unseen houses and unheard sounds.

BRIEF DESCRIPTION OF THE DRAWINGS

FIG. 4C generally illustrates steps of an example method for using knowledge-driven scene priors for semantic audio-visual embodied navigation according to the present disclosure.

FIG. 6 depicts a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

Figure 5:
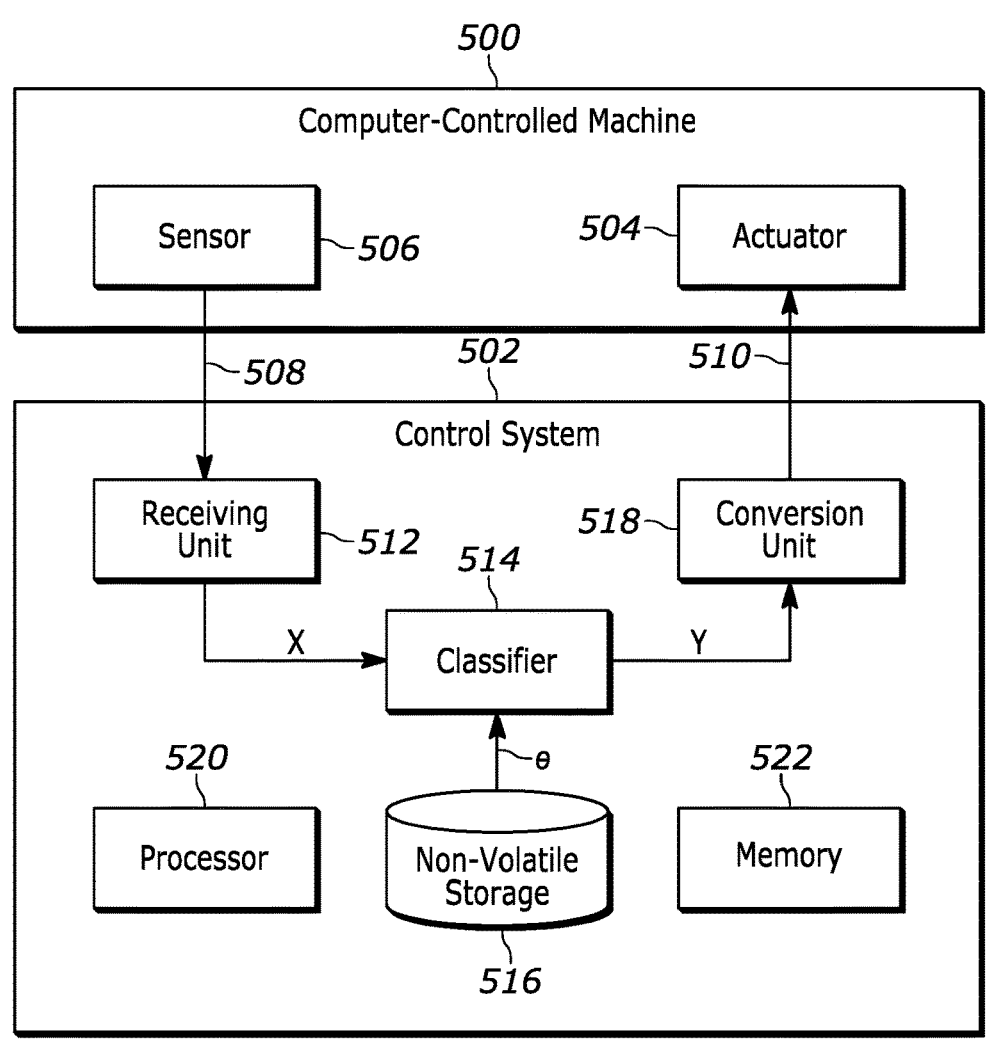
FIG. 5 depicts a schematic diagram of an interaction between a computer-controlled machine and a control system according to the principles of the present disclosure.
Figure 7:
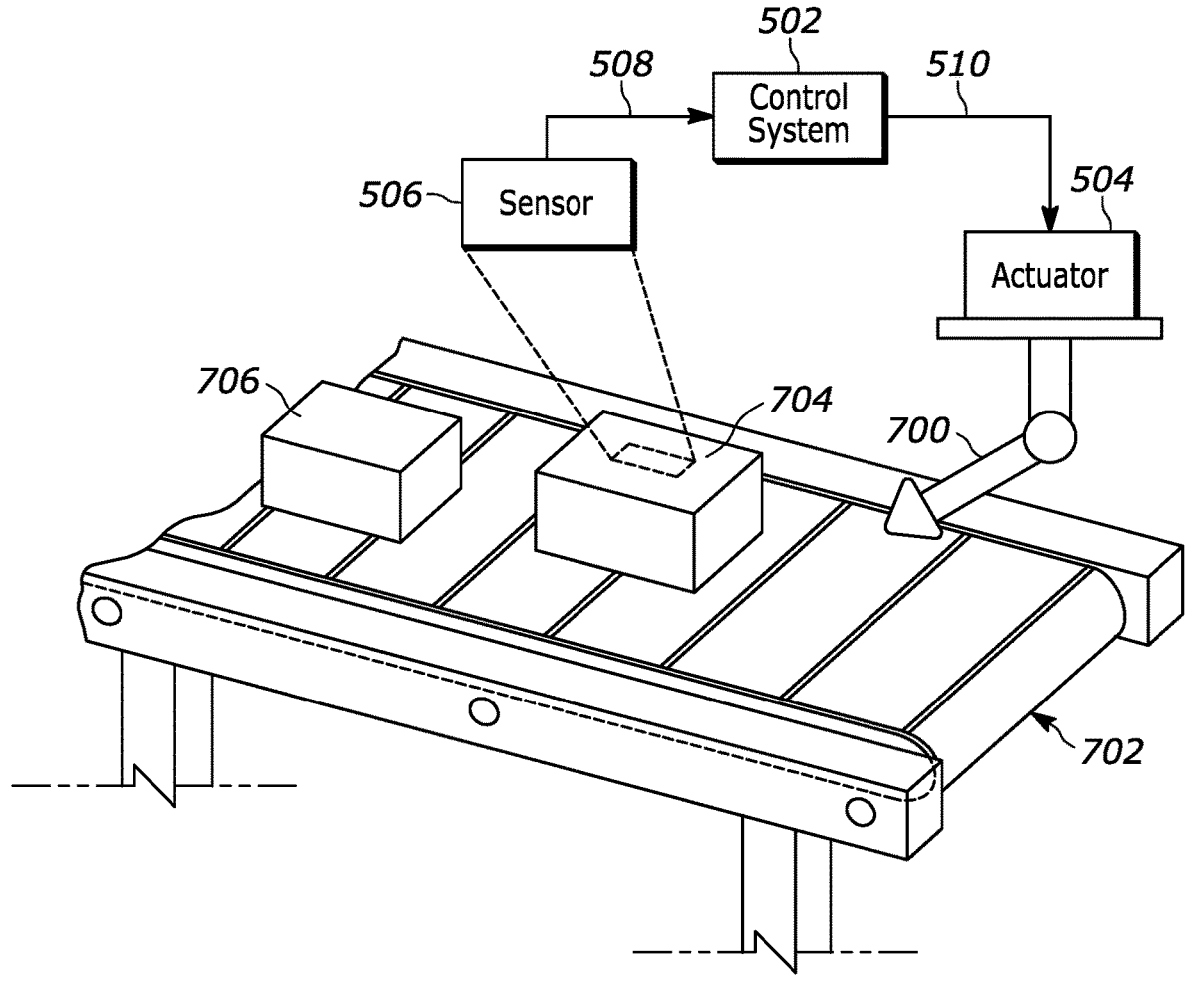

FIG. 7 depicts a schematic diagram of the control system of FIG. 5 configured to control a manufacturing machine, such as a punch cutter, a cutter or a gun drill, of a manufacturing system, such as part of a production line.

Figure 8:
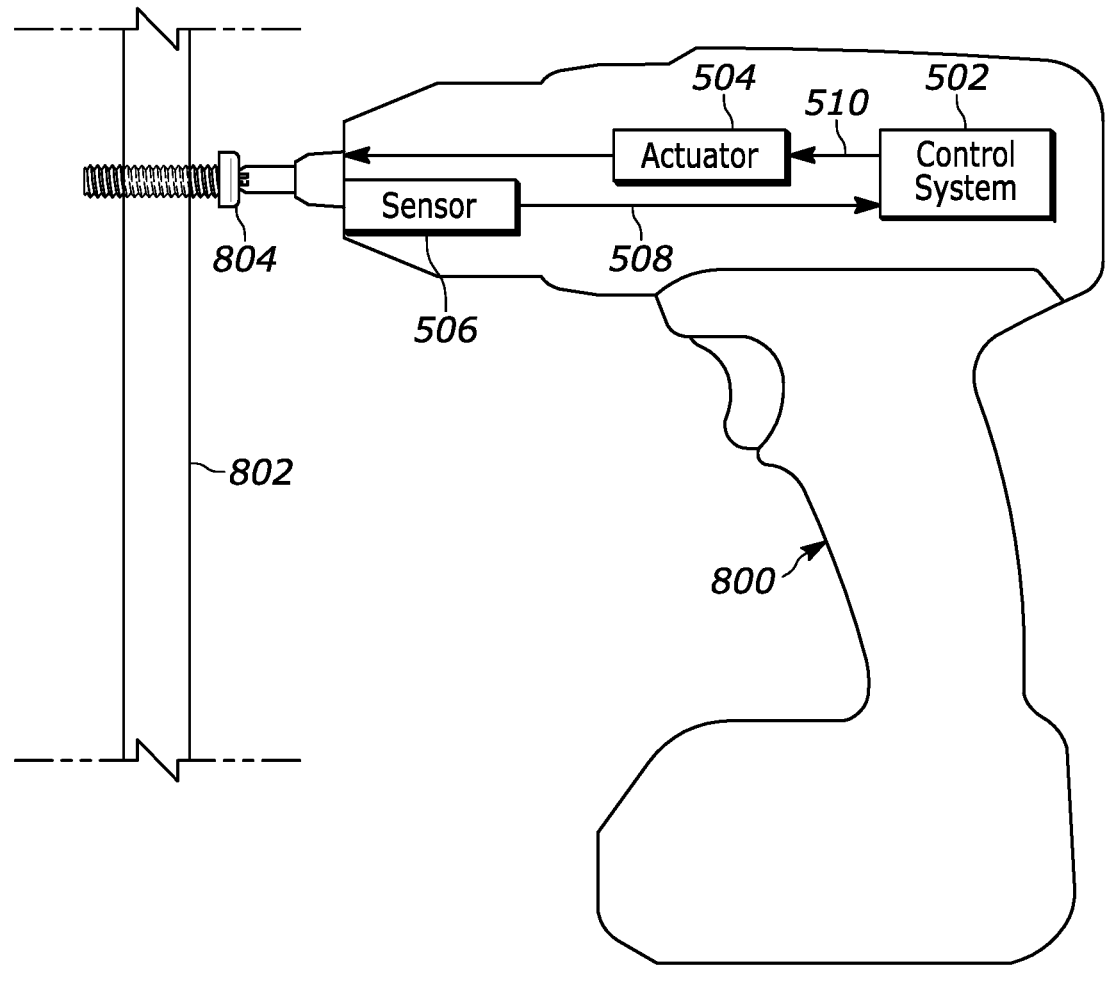

FIG. 8 depicts a schematic diagram of the control system of FIG. 5 configured to control a power tool, such as a power drill or driver that has an at least partially autonomous mode.

Figure 9:
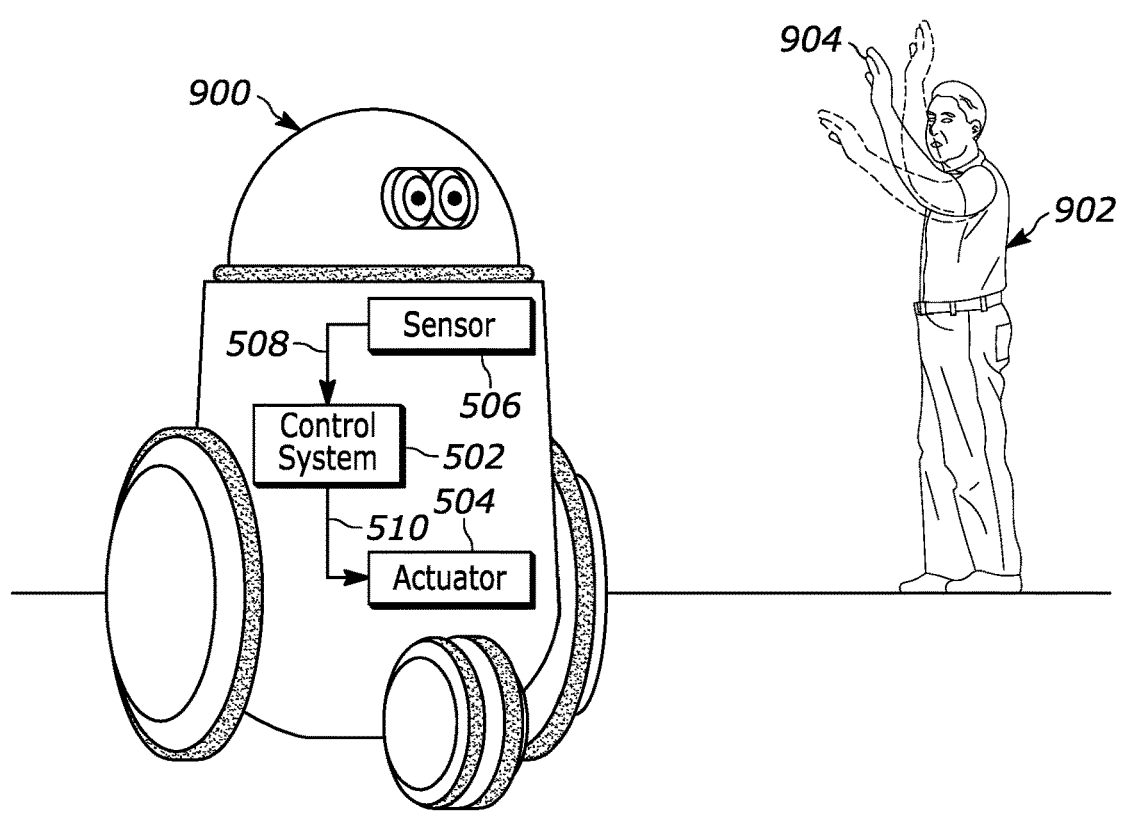

FIG. 9 depicts a schematic diagram of the control system of FIG. 5 configured to control an automated personal assistant.

Figure 10:
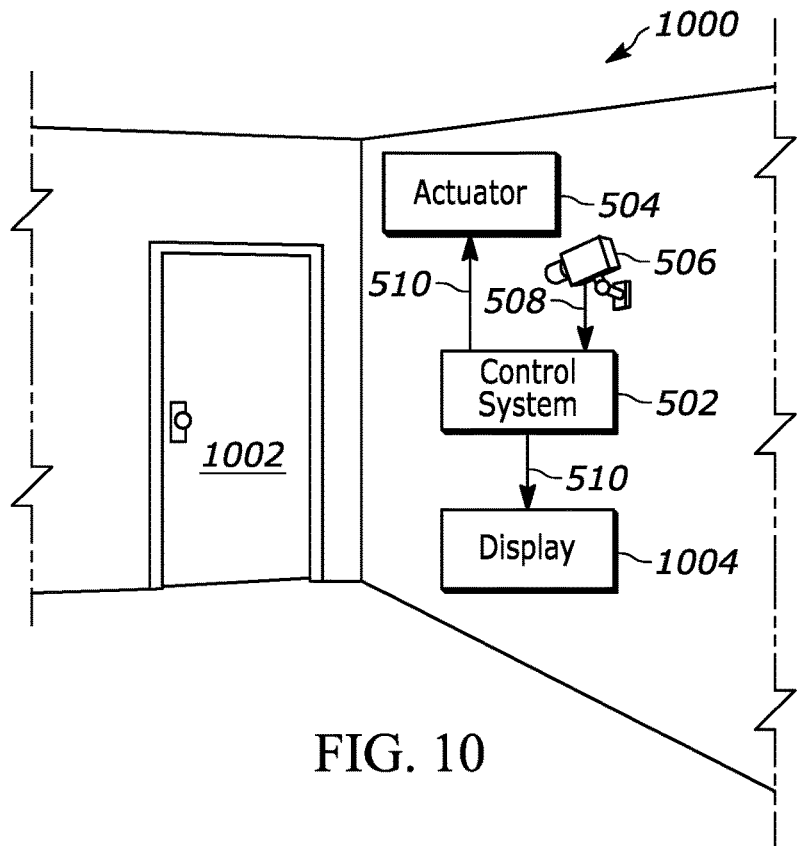

FIG. 10 depicts a schematic diagram of the control system of FIG. 5 configured to control a monitoring system, such as a control access system or a surveillance system.

Figure 11:
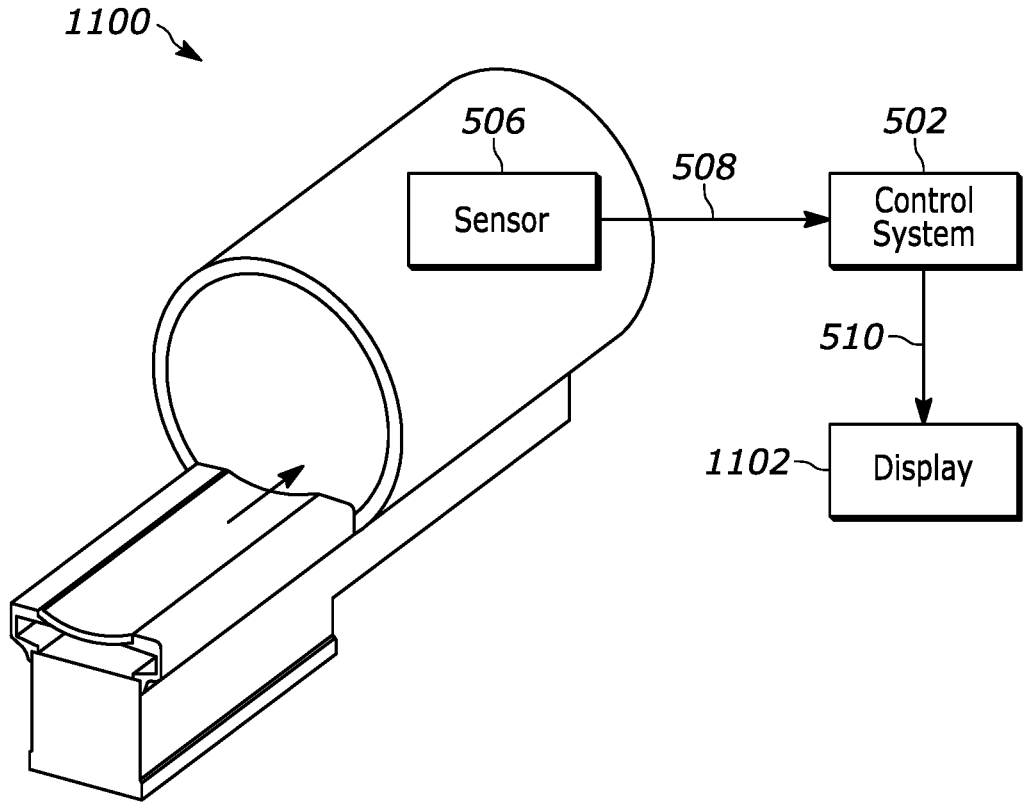

FIG. 11 depicts a schematic diagram of the control system of FIG. 5 configured to control an imaging system, for example an MRI apparatus, x-ray imaging apparatus or ultrasonic apparatus.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refer to both singular and plural referents unless the context clearly dictates otherwise. By way of example, "a processor" programmed to perform various functions refers to one processor programmed to perform each and every function, or more than one processor collectively programmed to perform each of the various functions.

In semantic audio-visual navigation (SAVi) systems, generalization to unseen contexts remains a challenge for embodied navigation agents. In the context of SAVi tasks, the notion of generalization should include both generalizing to unseen indoor visual scenes as well as generalizing to unheard sounding objects. However, previous SAVi task definitions do not include evaluation conditions on truly novel sounding objects, resorting instead to evaluating agents on unheard sound clips of known objects. Meanwhile, previous SAVi methods do not include explicit mechanisms for incorporating domain knowledge about object and region semantics. These weaknesses limit the development and assessment models' abilities to generalize learned experience.

SAVI systems and methods according to the present disclosure are configured to use knowledge-driven scene priors in semantic audio-visual embodied navigation tasks. For example, semantic information from a knowledge graph that encodes object-region relations, spatial knowledge from dual Graph Encoder Networks (GENs), and background knowledge from a series of pre-training tasks are combined within a reinforcement learning framework for audio-visual navigation. Further, an audio-visual navigation sub-task is defined such that agents are evaluated on novel sounding objects (i.e., as opposed to evaluation using only unheard clips of known objects). These systems and methods demonstrate improvements over strong baselines in generalization to unseen regions and novel sounding objects (e.g., within a Habitat-Matterport3D simulation environment, under a SoundSpaces (or other audio dataset) task).

For example, humans are able to use background experience (e.g., knowledge-driven priors) when navigating unseen or partially-observable environments. Prior experience informs their world model of the semantic relationships between objects commonly found in an indoor scene, the likely object placements, and the properties of the sounds those objects emit throughout object-object and object-scene interactions. Artificial embodied agents, constructed to perform goal-directed behavior in indoor scenes, may benefit from similar capabilities. Autonomous agents operating within homes and other indoor spaces may benefit from intuitive understanding about how objects are placed in different regions of houses for better interaction with the environment. Whereas external (e.g., domain) knowledge can yield improvements in agent sample-efficiency while learning, generalizability to unseen environments during inference, and overall interpretability in decision-making, it may be difficult to identify generalizable solutions by injecting knowledge in embodied agents.

The task of semantic audio-visual navigation lends itself especially well to the use of domain knowledge (e.g., in the form of human-inspired background experience (encapsulated as a prior over regions and semantically-related objects contained therein)). Certain sounds can be associated with particular places (e.g., a smoke alarm is more likely to originate in the kitchen). To infer such semantic information from sounds in an environment, systems and methods according to the present disclosure implement the use of knowledge-enhanced priors.

By using a prior constructed in accordance with general experiences, a trained model may generalize to novel sound sources. Further, a modular training paradigm may provide improvements in cross-domain generalizability and more tractable optimization. Agent performance can be evaluated against a set of novel sounding objects that were not introduced during training.

In an example, knowledge-driven scene priors are introduced in the semantic audio-visual embodied navigation task. For example, semantic information the novel knowledge graph that encodes object-region relations, spatial knowledge from dual Graph Encoder Networks, and background knowledge from a series of pre-training tasks are combined within a reinforcement learning (RL) framework. A knowledge graph that encodes object-object, object-region, and region-region relations in house environments is defined. A multimodal dataset for pre-training a visual encoder is curated to facilitate object-awareness in visual scene understanding. A new task of semantic audio-visual navigation is defined, wherein agent performance is assessed on the basis of generalization to novel sounding objects.

In some applications, modular designs increase task performance and generalizability, especially in unexplored scenarios, compared to end-to-end counterparts. Accordingly, systems and methods of the present disclosure may implement a modular framework for semantic audio-visual navigation that includes pre-trained and knowledge-enhanced scene priors, thereby facilitating improved unseen generalization.

With respect to knowledge graphs in visual navigation, combining prior knowledge with machine learning systems provides improvements in generalizability and sample-efficiency. For example, integrating symbolic knowledge with navigation agents may be difficult. A knowledge graph according to the present disclosure is configured to include all object-object, object-region, and region-region semantics, which enables a more complex reasoning path (e.g., sound→object→region) in audio-visual navigation. In this manner, the principles of the present disclosure incorporate knowledge-driven scene priors into audio-visual navigation tasks.

Systems and methods of the present disclosure may use a simulation environment and audio dataset (e.g., Soundspaces) to configure and assess audio-visual navigation policies. The dataset is based on photorealistic indoor environments (e.g., from the Matterport3D and Replica datasets) to which a set of sound sources commonly found in indoor environments (e.g., household appliances, musical instruments, telephones, etc.) were incorporated. The SoundSpaces dataset is split such that indoor scenes encountered during testing are not found in the episodes used during a training stage. However, sounds of objects encountered during training may also appear during testing. Audio-visual navigation may also be trained and/or tested using an interactive 3D environment or simulation platform, such as AI2-THOR, which contains computer-generated graphical imagery. Systems and methods of the present disclosure apply a Visual-Audio Room (VAR) benchmark comprising a plurality of (e.g., seven) different indoor environments, a subset of which (e.g., two) may be used for training while remaining ones (e.g., five) are used for testing. The VAR benchmark incorporates three different audio categories: ring tone, alert alarm, and clocks. Similar to the audio-visual navigation task, the same sound sources are found in both training scenes and testing scenes. In the context of audio-visual navigation (AVN) tasks, generalization to unseen environments pertains to both generalizing to unseen visual scenes as well as to unheard sounds. Current audio-visual benchmarks do not consider unheard sounds. Thus, there is no direct assessment of generalization performance to unheard sounds. A curated version of an audio dataset according to the present disclosure incorporates an evaluation of the agent in four areas: (1) seen indoor environments (e.g., houses) and heard sounds, (2) seen houses and unheard sounds, (3) unseen houses and heard sounds, and (4) unseen houses and unheard sounds.

Figure 1:
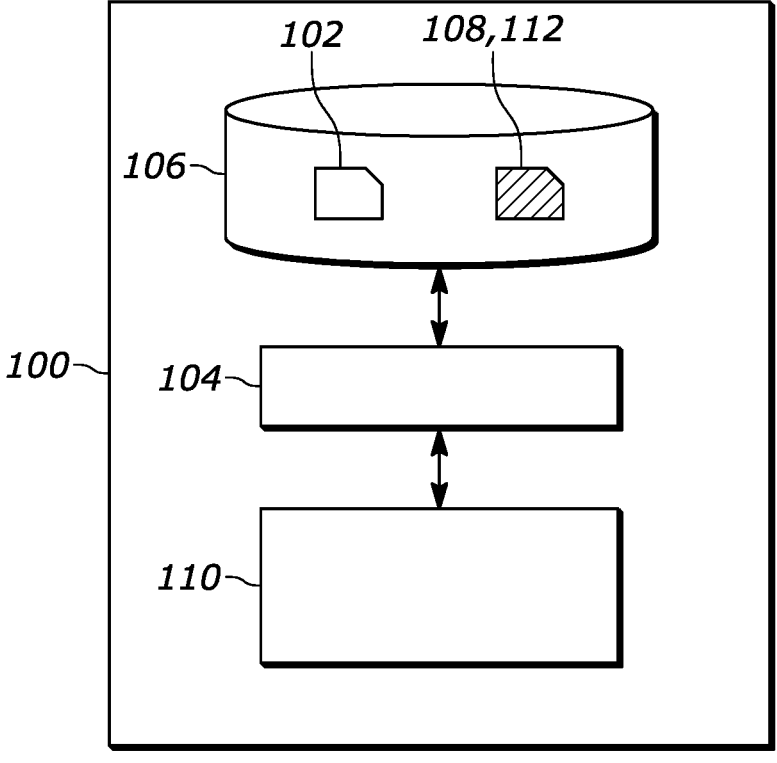
FIG. 1 generally illustrates a system for training a neural network according to the principles of the present disclosure.

FIG. 1 shows a system 100 for training a neural network (e.g., of an ML model). The system 100 may be configured to (and/or include circuitry configured to) implement the systems and methods of the present disclosure described below in more detail. The system 100 may comprise an input interface for accessing training data 102 for the neural network. For example, as illustrated in FIG. 1, the input interface may be constituted by a data storage interface 104 which may access the training data 102 from data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also external data storage, e.g., network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network.

The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may, during or after the training, be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
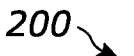
FIG. 2 generally illustrates a data annotation/augmentation system configured to implement a system for annotating and/or augmenting data according to the principles of the present disclosure.

FIG. 2 depicts a data annotation/augmentation system 200 configured to (and/or including circuitry configured to) implement a system for annotating and/or augmenting data. The data annotation system 200 may include at least one computing system 202 configured to implement all or portions of the systems and methods of the present disclosure explained below in more detail. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. Various components of the system 200 may be implemented with same or different circuitry.

During operation, the CPU 206 may execute stored program instructions that are retrieved from the memory unit 208. The stored program instructions may include software that controls operation of the CPU 206 to perform the operation described herein. In some embodiments, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 (e.g., represented in FIG. 2 as the ML Model 210) or algorithm, a training dataset 212 for the machine-learning model 210, raw source dataset 216, etc.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232.

The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning model 210 that is configured to analyze the raw source dataset 216. For example, the CPU 206 and/or other circuitry may implement the machine-learning model 210. The raw source dataset 216 may include raw or unprocessed sensor data that may be representative of an input dataset for a machine-learning system. The raw source dataset 216 may include video, video segments, images, audio, text-based information, and raw or partially processed sensor data (e.g., radar map of objects). In some embodiments, the machine-learning model 210 may be a deep-learning or neural network algorithm that is designed to perform a predetermined function. For example, the neural network algorithm may be configured to identify events or objects in video segments based on audio data.

The computer system 200 may store the training dataset 212 for the machine-learning model 210. The training dataset 212 may represent a set of previously constructed data for training the machine-learning model 210. For example, the training dataset 212 according to the present disclosure may include multiple automatically-collected ground-truth measurements and associated data. The training dataset 212 may be used by the machine-learning model 210 to learn weighting factors associated with a neural network algorithm. The training dataset 212 may include a set of source data that has corresponding outcomes or results that the machine-learning model 210 tries to duplicate via the learning process.

The machine-learning model 210 may be operated in a learning mode using the training dataset 212 as input. The machine-learning model 210 may be executed over a number of iterations using the data from the training dataset 212. With each iteration, the machine-learning model 210 may update internal weighting factors based on the achieved results. For example, the machine-learning model 210 can compare output results (e.g., annotations) with those included in the training dataset 212. Since the training dataset 212 includes the expected results, the machine-learning model 210 can determine when performance is acceptable. After the machine-learning model 210 achieves a predetermined performance level (e.g., 100% agreement with the outcomes associated with the training dataset 212), the machine-learning model 210 may be executed using data that is not in the training dataset 212. The trained machine-learning model 210 may be applied to new datasets to generate annotated data.

The machine-learning model 210 may be configured to identify a particular feature in the raw source data 216. The raw source data 216 may include a plurality of instances or input dataset for which annotation results are desired (e.g., a video stream or segment including audio data). For example only, the machine-learning model 210 may be configured to identify objects or events in a video segment based on audio data and annotate the events. The machine-learning model 210 may be programmed to process the raw source data 216 to identify the presence of the particular features. The machine-learning model 210 may be configured to identify a feature in the raw source data 216 as a predetermined feature. The raw source data 216 may be derived from a variety of sources. For example, the raw source data 216 may be actual input data collected by a machine-learning system. The raw source data 216 may be machine generated for testing the system. As an example, the raw source data 216 may include raw video and/or audio data from a camera, audio data from a microphone, etc.

In an example, the machine-learning model 210 may process raw source data 216 and output video and/or audio data including one or more indications of an identified event. The machine-learning model 210 may generate a confidence level or factor for each output generated. For example, a confidence value that exceeds a predetermined high-confidence threshold may indicate that the machine-learning model 210 is confident that the identified event (or feature) corresponds to the particular event. A confidence value that is less than a low-confidence threshold may indicate that the machine-learning model 210 has some uncertainty that the particular feature is present.

Figure 3A:
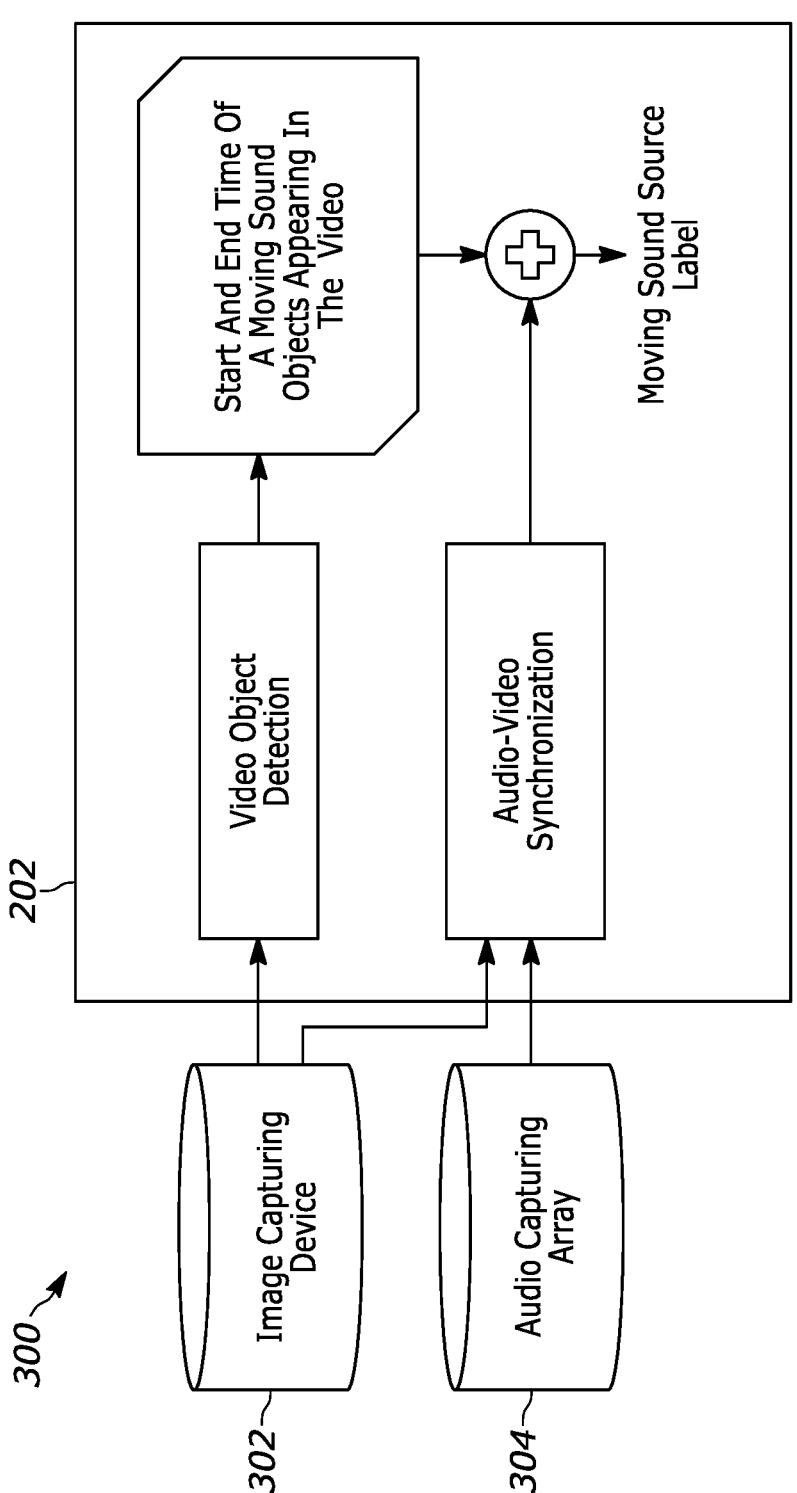
FIG. 3A generally illustrates an audio data labeling system according to the principles of the present disclosure.
Figure 3B:
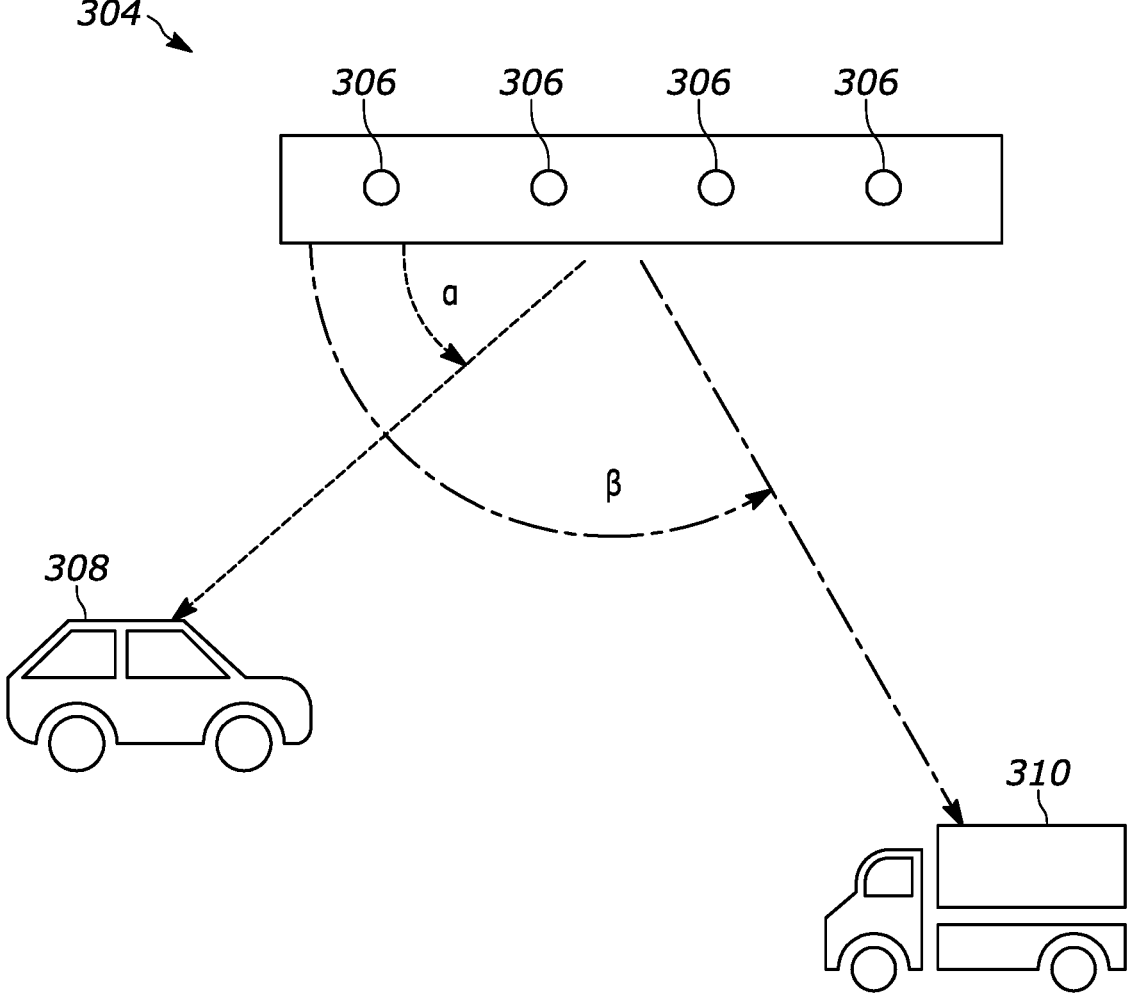
FIG. 3B generally illustrates a portion of a data capturing system according to the principles of the present disclosure.

As is generally illustrated in FIGS. 3A and 3B, a system 300 may include an image (e.g., video) capturing device 302, an audio capturing array 304, and the computing system 202. The system may receive, from the image capturing device 302, video stream data associated with a data capture environment. The system 202 may be configured to perform video object detection to identify one or more objects in corresponding images of the video stream data. The system 202 may receive, from the audio capturing array 304, audio stream data that corresponds to at least a portion of the video stream data. The audio capturing array 304 may include one or more microphones 306 or other suitable audio capturing devices. The systems and methods described herein may be configured to label, using output from at least a first machine-learning model (e.g., such as the machine-learning model 210 or other suitable machine-learning model configured to provide output including one or more object or event detection predictions), at least some objects of the video stream data and/or audio stream data.

The system 202 may calculate (e.g., using at least one probabilistic-based function or other suitable technique or function), based on at least one data capturing characteristic, at least one offset value for at least a portion of the audio stream data that corresponds to at least one labeled object of the video stream data. The system 202 may synchronize, using at least the at least one offset value, at least a portion of the video stream data with the portion of the audio stream data that corresponds to the at least one labeled object of the video stream data. The at least one data capturing characteristic may include one or more characteristics of the at least one image capturing device, one or more characteristics of the at least one audio capturing array, one or more characteristics corresponding to a location of the at least one image capturing device relative to the at least one audio capturing array, one or more characteristics corresponding to a movement of an object in the video stream data, one or more other suitable data capturing characteristics, or a combination thereof.

The system 202 may label, using one or more labels of the labeled objects of the video stream data and the at least one offset value, at least the portion of the audio stream data that corresponds to the at least one labeled object of the video stream data. Each respective label may include an event type, an event start indicator, and an event end indicator. The system 202 may generate training data using at least some of the labeled portion of the audio stream data. The system 202 may train a second machine-learning model using the training data. The system 202 may detect, using the second machine-learning model, one or more sounds associated with audio data provided as input to the second machine-learning model. The second machine-learning model may include any suitable machine-learning model and may be configured to perform any suitable function, such as those described herein with respect to FIGS. 4-11.

Figure 3C:
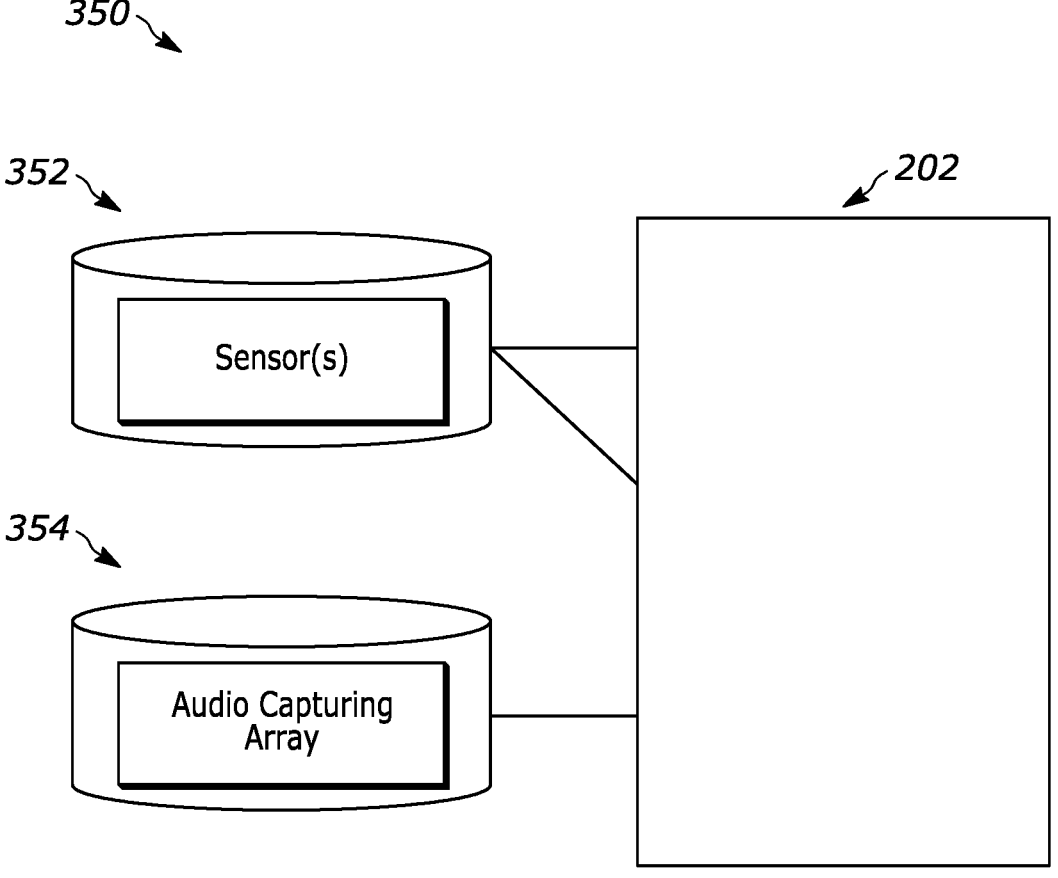
FIG. 3C generally illustrates an alternative audio data labeling system, according to the principles of the present disclosure.

In some embodiments, as is generally illustrated in FIG. 3C, the computing system 202 may be configured to label audio data based on sensor data received from one or more sensors, such as those described herein or any other suitable sensor or combination of sensors. The system 202 may receive, from the audio capturing array 354 or any suitable audio capturing device, such as one or more of the microphones 306 or other suitable audio capturing device, audio stream data associated with a data capture environment. It should be understood that the audio capturing array 354 may include features similar to those of the audio capturing array 304 and may include any suitable number of audio capturing devices. The system 202 may receive, from at least one sensor (e.g., such as the sensor 352) that is asynchronous relative to the audio capturing array 354, sensor data associated with the data capture environment. The sensor 354 may include at least one of an induction coil, a radar sensor, a LiDAR sensor, a sonar sensor, an image capturing device, any other suitable sensor, or a combination thereof. The audio capturing array 354 may be remotely located from the sensor 354, proximately located to the sensor 354, or located in any suitable relationship to the sensor 354.

The system 202 may identify, using output from at least a first machine learning model, such as the machine learning model 210 or other suitable machine learning model, at least some events in the sensor data. The machine learning model 210 may be configured to provide output including one or more event detection predictions based on the sensor data. The system 202 may synchronize at least a portion of the sensor data associated with the portion of the audio stream data that corresponds to the at least one event of the sensor data. The system 202 may label, using one or more labels extracted for respective events of the sensor data value, at least the portion of the audio stream data that corresponds to the at least one event of the sensor data. Each respective label may include an event type, an event start indicator, and an event end indicator. The system 202 may generate training data using at least some of the labeled portion of the audio stream data. The system 202 may train a second machine-learning model using the training data. The system 202 may detect, using the second machine-learning model, one or more sounds associated with audio data provided as input to the second machine-learning model. The second machine-learning model may include any suitable machine-learning model and may be configured to perform any suitable function, such as those described herein with respect to FIGS. 4-11.

Any of the systems described above and/or below in more detail may implement systems and methods of the present disclosure to configure and assess audio-visual navigation policies (e.g., by using a simulation environment and audio dataset). In particular, systems and methods described below include an assessment of generalization performance that considers unheard sounds. A curated version of an audio dataset according to the present disclosure incorporates an evaluation in each of (1) seen indoor environments (e.g., houses) and heard sounds, (2) seen houses and unheard sounds, (3) unseen houses and heard sounds, and (4) unseen houses and unheard sounds.

For example, in a semantic audio-visual navigation (SAVi) task, an agent (e.g., a device configured to navigate an environment) is initialized at a random location of an unmapped 3D house environment, which contains a sounding object (e.g., piano) configured to generate a target sound. The task of the agent is to reach the sounding object using sensory inputs, which include both visual and audio sensors. One or more assumptions may be included in the task, such as assumptions that (i) the target sound has variable length in an episode and may not be available at every time step, and the target sound may stop during navigation (e.g., telephone ringing sound stops after some time); and (ii) the sounding object has a physical and semantically-meaningful embodiment in the scene (e.g., the sound of a telephone ring is associated with a physical manifestation of a telephone, as opposed to the sound of an airplane passing overhead being associated with the center of the living room). These assumptions are realistic because sound events have variable length in the real world and are based on the semantics of the corresponding sounding objects. Due to the variable-length nature of the sound, the agent cannot may not be able to rely exclusively on the audio signal to reach the sounding object. Instead, the agent needs to use the audio signal to both predict the location of the sounding object as well as understand the semantics of the object. Moreover, to navigate effectively, the agent needs to associate various visual cues with the sound and analyze object and region relationships.

Systems and methods according to the present disclosure modify the SAVi task by evaluating agents on completely unheard sounding objects. Typically, agents are evaluated on unheard clips of known sounding objects. In contrast, in the systems and methods of the present disclosure, agents are further evaluated on completely unknown sounding objects. For example, a set of sounding objects $\mathcal{O}$ (e.g., shower, TV monitor, etc.), a set of indoor regions $\mathcal{R}$ (e.g., bathroom, living room), and a set of houses $\mathcal{H}$ are collectively considered. A particular house $h_i \in \mathcal{H}$ has a set of regions $\{r_{i1}, r_{i2}, \ldots, r_{ij}\}$ and a set of objects $\{o_{i1}, o_{i2}, \ldots, o_{ik}\}$, where there are k objects placed in j regions of the house $h_i$. Multiple instances of each sounding object $o \in \mathcal{O}$ and region $r \in \mathcal{R}$ may be included across all houses $\mathcal{H}$ considered. A total set of possible houses $\mathcal{H}$ is divided into two mutually exclusive subsets: $\mathcal{H}_{seen}$ and $\mathcal{H}_{unseen}$. Similarly, sounding objects $\mathcal{O}$ are divided into $\mathcal{O}_{heard}$ and $\mathcal{H}_{unheard}$. The houses in $\mathcal{H}_{seen}$ and the sounding objects in $\mathcal{O}_{heard}$ are only experienced by agents during training while the agents are evaluated on unheard sounding objects $\mathcal{O}_{unheard}$. To solve this task, agents are configured to learn to reason about novel sounds based on prior knowledge. In this manner, the agents are enable to reach sounding objects that have not been previously experienced (i.e., heard).

To incorporate knowledge-driven scene priors for audio-visual navigation in accordance with principles of the present disclosure, a knowledge-driven approach for semantic audio-visual embodied navigation (K-SAVEN) model incorporates scene priors in knowledge graph form and extracts relational features using Graph Encoder Networks (GEN) for audio and visual modalities. GENs provide agents with reasoning capability, using prior knowledge, and dynamically update agent beliefs according to observations (e.g., observation data obtained)) from the environment. The model also incorporates a Scene Memory Transformer (SMT) that captures long-term dependencies by recording visual features in memory and locating the goal by attending to acoustic features. Visual observation data is used to compute visual features, including vision-based semantic knowledge vector and features encoded from the vision encoder. Similarly, audio observation data is used to compute acoustic features, including audio-based semantic knowledge vectors, features encoded from an audio encoder, and location prediction. Thus, the prior knowledge-driven reasoning capability using GENs with the memory-based attention mechanism using the SMT allows the agent to generalize to novel houses and sounding objects, exploit spatio-temporal dependencies, and efficiently navigate to the goal.

Figure 4A:
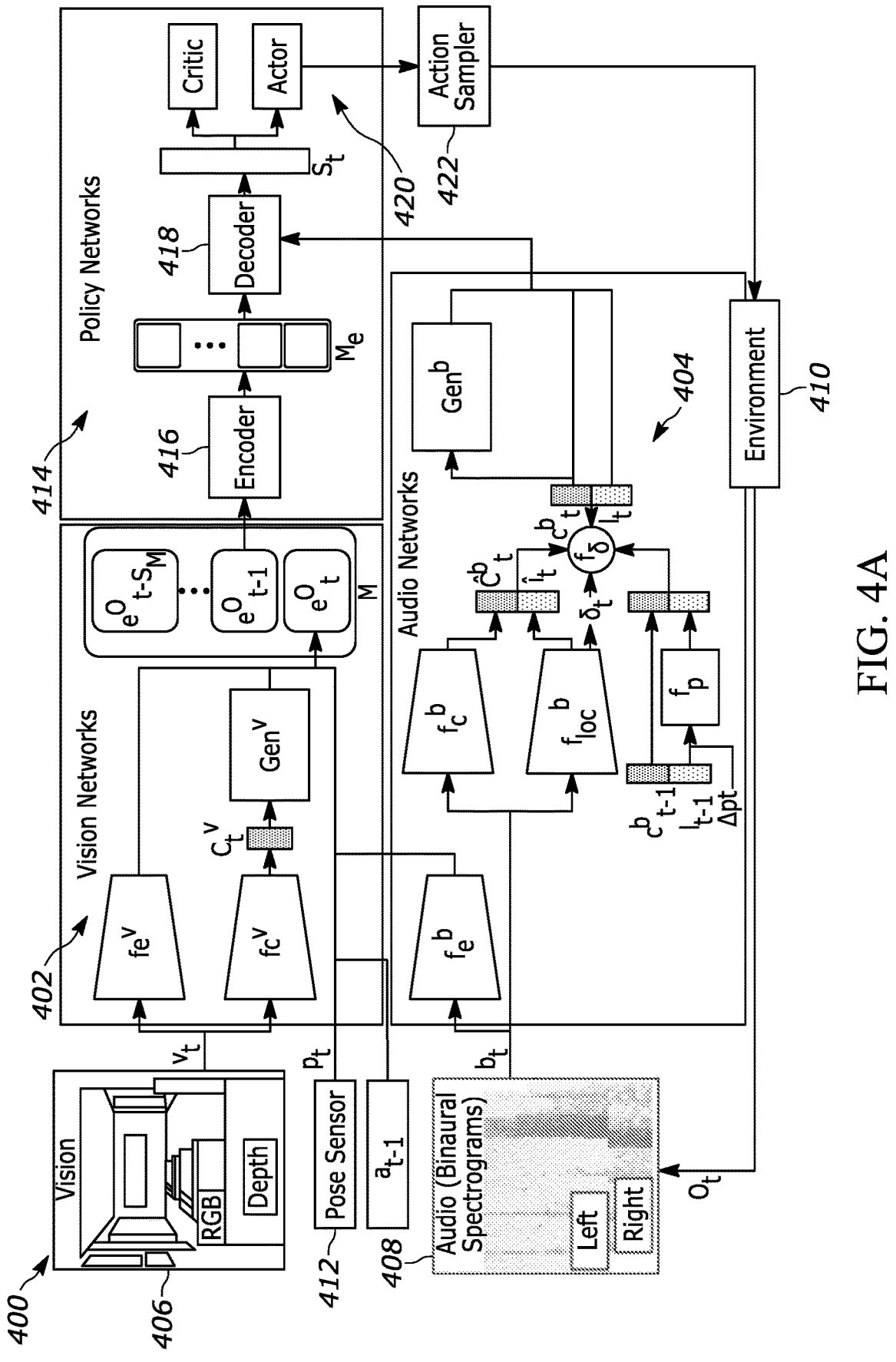
FIG. 4A generally illustrates an example system configured to implement knowledge-driven scene priors according to the principles of the present disclosure.

FIG. 4A shows one example implementation of a system 400 configured to implement the principles of the present disclosure. The system 400 includes: (i) pre-trained models (e.g., navigation models) that, given audio and visual observation data from the environment, predict objects and regions; (ii) Graph Encoder Networks (GENs) configured to calculate audio-semantic and visual-semantic feature embeddings; (iii) a vision encoder configured to project visual observation data at each step to an embedding space; (iv) an audio encoder configured to project audio observation data at each step to an embedding space; (v) a location predictor that, given an acoustic signal from the sounding object, predicts a relative distance to and direction from the agent; and (vi) an SMT configured to implement an attention-based policy network, which computes a distribution over actions, given encoded observation data in scene memory and the acoustic observation that captures goal information.

For example, as shown in FIG. 4A, a visual observation $v_t$ is provided to a vision encoder $f_e^v$ and a pre-trained vision model $f_c^v$ of vision networks 402. The vision encoder encodes the visual observation while the vision model, given the visual observation, predicts classification scores $c_t^v$ for objects and regions within the visual observation. The classification scores predicted by the vision model are used by a vision-based graph encoder network $GEN^v$ to compute visual-semantic feature embeddings. Conversely, a binaural audio observation $b_t$ is provided to three models of audio networks 404: an audio encoder $f_e^b$ configured to encode the audio observation, a location predictor $f_{loc}^b$ configured to predict a distance and direction $l_t$ of the sounding object from the agent and a direct-to-reverberant-ratio $\delta_t$, and a pre-trained audio model $f_c^b$ configured to, given the audio observation, predict classification scores $c_t^b$ for objects. The classification scores predicted by the audio model are used by an audio-based graph encoder network $GEN^b$ to compute audio-semantic feature embeddings. The visual observation and audio observation respectively correspond to vision data 406 and audio data 408 from an observation $O_t$ of an environment 410.

Outputs of the vision encoder $f_e^v$, the vision-based $GEN^v$, and the audio encoder $f_e^b$ are stored in memory M as visual information, along with a pose $p_t$ of the agent (e.g., as sensed by a pose sensor 412) and a previous action $a_{t-1}$. An attention-based policy network 414 conditions/encodes (e.g., using an encoder 416) the visual information as encoded visual information $M_e$ on the acoustic information, enabling the agent to associate visual cues with acoustic events and predict the state representation $s_t$ (e.g., using a decoder 418) associated with the agent, which contains spatial and semantic cues helpful to reach the goal faster. An actor-critic network 420, given the state $s_t$, predicts the next action $a_t$, which may be sampled by action sampler 422.

The agent relies on audio observation data to set a goal and uses visual observation data to navigate to that goal. The agent must detect objects and regions in a given observation. Accordingly, the audio classification model $f_c^b$ is trained to predict a score for each object $o \in \mathcal{O}$, as a likelihood that o produced the acoustic observation, and a vision classification model $f_c^v$ to predict a score for each object $o \in \mathcal{O}$ and region $r \in \mathcal{R}$, as a likelihood that the observation corresponds to region r. The acoustic event has variable length and may not be present $a_t$ each time step, so the agent cannot rely on a current audio observation alone as a persistent signal. Thus, the model of the present disclosure aggregates the current prediction $\hat{c}_t^b$ with the previous prediction $c_{t-1}^b$, $c_t^b = f_\delta(\hat{c}_t^b, c_{t-1}^b) = (1-\delta)\hat{c}_t^b + \delta_{t-1}^b$, where $\delta$ is the weighting factor set to 0.5. When the acoustic event stops (i.e., zero sound intensity is detected), the agent uses a latest estimate $c_t^b$.

Figure 4B:
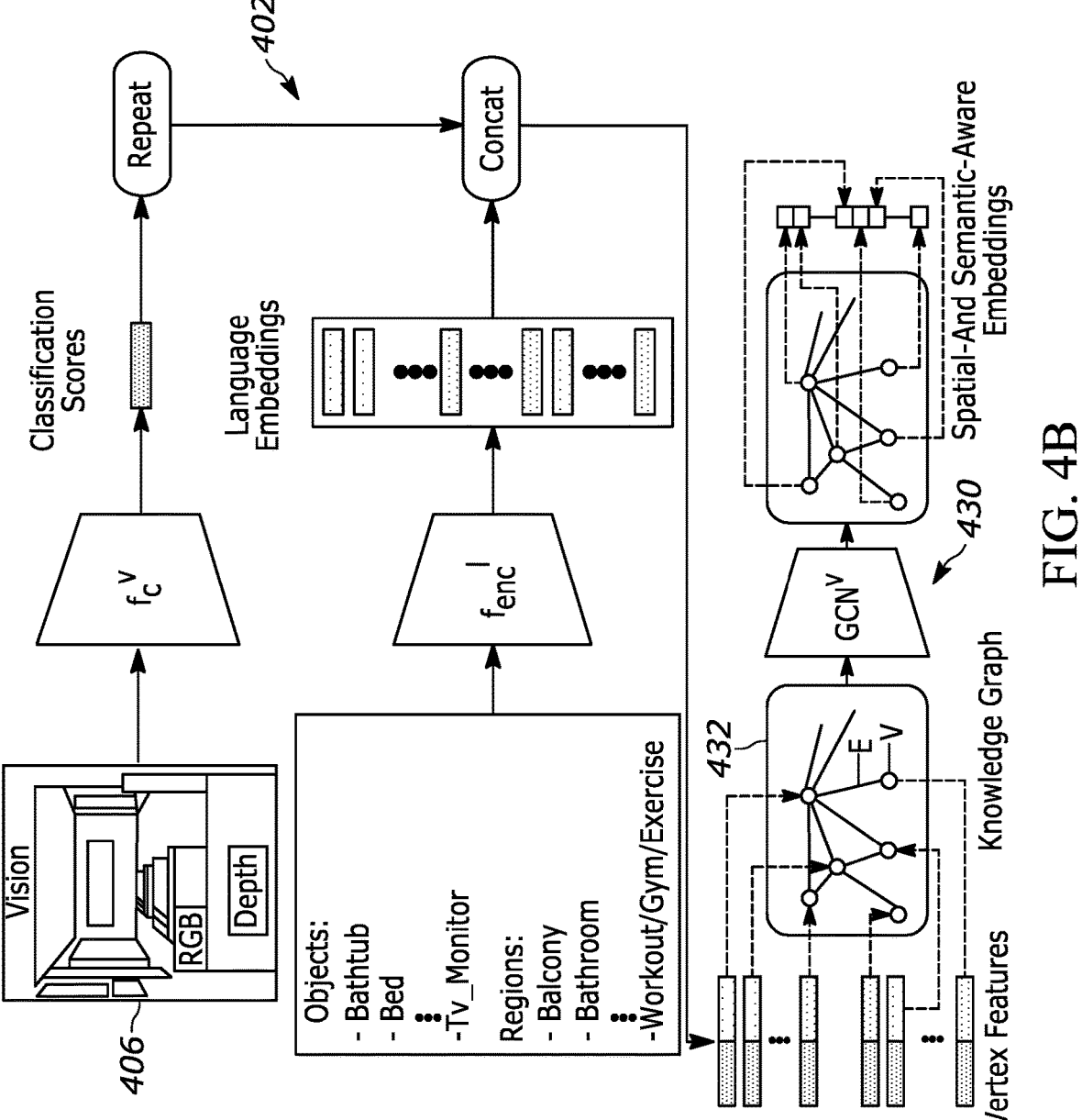
FIG. 4B generally illustrates an example graph encoder network according to the principles of the present disclosure.

FIG. 4B illustrates an example graph encoder network 430 (e.g., corresponding to $GEN^v$ of FIG. 4A) incorporating a knowledge graph 432 in which each vertex denotes an object or region category. The initial vertex features provided to $GEN^v$ are initialised with the joint embedding obtained by concatenating word embeddings of object or region names and classification scores of objects and regions based on the current observation. $GEN^v$ performs information propagation through three layers, and the output of $GEN^v$ is spatial and semantic aware embeddings. The audio-based GEN ($GEN^b$ of FIG. 4A) uses $f_c^b$ and $GEN^b$ instead of $f_c^v$ and $GEN^v$.

The knowledge graph 432 according to the present disclosure captures spatial relationships between object-to-object, object-to-region, and region-to-region. These spatial relationships correspond to prior knowledge about how objects are placed in regions of houses and enable the agent to reason about where to find novel-sounding objects for efficient navigation. More specifically, this prior knowledge enables a reasoning path of Sound→Object→Region, which is critical to the task of audio-conditioned visual navigation. For example, a squeaky sound produced by a chair may be novel to the agent but the agent knows that chairs are usually kept close to tables or cushions and found in living rooms or offices. Accordingly, the agent may decide to navigate to regions that usually have chairs and objects usually placed close to chairs, which would lead to finding the chair faster than not knowing such spatial and semantic relationships between objects and regions. The knowledge graph 432 is denoted by an undirected graph G=(V, E), where V and E denote vertices and edges, respectively. Each vertex denotes an object or region, and each edge denotes the relationship between a pair of vertices. To compute these relationships, a dataset (e.g., a Matterport3D dataset) containing semantic labels of objects and regions is used (e.g., a data set of 42 objects and 30 regions for 90 houses). In one example, 21 objects and 24 regions (|V|=45) were used in a SAVi task to build the knowledge graph 432. More specifically, two objects are connected with an edge if they are found in the same region and their frequency of occurrence is above a threshold. This frequency may be calculated with respect to the most frequent object of that region and the threshold is set to the maximum value that connects each object with at least one other object. An object and region are connected if the region contains other objects, which are connected with the object based on object-to-object relations. Finally, two regions are connected if their frequency of containing connected objects, based on object-to-object relations, is above a threshold. The threshold is to the maximum value connecting each region with at least one other region.

Referring again to FIG. 4A, the system 400 further implements location prediction and direct-to-reverberant ratio (DRR) estimation. The audio observation contains information about the relative distance and direction from the agent to the sounding object. Accordingly, a location predictor $f_{loc}^b$ is trained to predict a location $\hat{l}_t=(\Delta x, \Delta y)$, relative to the current pose $p_t$ of the agent, and the direct-to-reverberant ratio (DRR)$\in[0,1]$ of the impulse response between the sounding source and the agent. Similar to the pre-trained audio model, the location prediction also aggregates the current estimate $\hat{l}_t$ with the previous $\hat{l}_{t-1}$, $l_t=f_\delta(\hat{l}_t,l_{t-1},\Delta p_t,\delta_t)=\delta_t \hat{l}_t+(1-\delta_t)f_p(l_{t-1}, \Delta p_t)$, where $f_p(\cdot)$ transforms the previous location prediction $l_{t-1}$ based on the last pose change $\Delta p_t$. Here, $\delta_t$ is either fixed to 0.5 $\forall t$ (exponential average) or assigned the value of the estimated DRR (e.g., a dynamic average). The agent uses a latest estimate $l_t=f_p$ $(l_{t-1}, \Delta p_t)$ when the acoustic event stops. DRR prediction also functions as an auxiliary task, as it will help the agent better estimate the directness and location of the sounding object. In fact, DRR provides an indirect measure of the acoustic distance between the source and the agent independent of the sound level of the source. At training time, the ground truth for $\delta_t$ is built from the room impulse response (RIR) between the source and the agent as the ratio between the energy of the RIR in the first 10 ms after the peak and the overall energy of the RIR. Thus, $\delta_t$ measures how direct the acoustic propagation between the sounding object and the agent is. In other words, when the agent is far from the source, $\delta_t$ tends towards 0. Conversely, as the agent gets closer to the source, $\delta_t$ increases. When the source is silent, $\delta_t$ equals 0. Accordingly, $\delta_t$ predicts trustworthiness of location prediction based on the binaural sound itself.

The graph encoder networks $GEN^v$ and $GEN^b$ are configured to extract a semantic knowledge vector using the graph $G=(V, E)$. The input to each vertex v is feature vector xv, which is a concatenated representation of both semantic cues (i.e., language embeddings) and the visual or acoustic cues (i.e., the classification score for objects and regions based on the current visual image or sound signal). In an example, the language embeddings are generated by global vectors for word representation (GloVe) (as shown by $(f_{enc}^l)$ in FIG. 4A) and the classification score is generated by pre-trained vision $(f_c^v)$ or audio $(f_c^b)$ models. The knowledge graph may be represented as a binary adjacency matrix A. Normalization is performed on the adjacency matrix A to obtain $\tilde{A}$. When $X=[x_1, \ldots, x_{|V|}]\in R^{|V|\times D}$ is the inputs of all vertices and $Z=[z_1, \ldots, z_{|V|}]\in R^{|V|\times F}$ is the output of the graph encoder networks $GEN^v$ and $GEN^b$, D and F denote the dimension of the input and output feature. The graph encoder networks $GEN^v$ and $GEN^b$ perform in accordance with the following layer-wise information propagation rule: $H^{(l+1)}=\sigma(\tilde{A}H^{(l)}W^{(l)})$. Here, $H^{(0)}=X$, $H^{(L)}=Z$, $W^{(l)}$ is the parameter for the l-th layer, L is the number of GEN layers, and σ denotes an activation function. Each vertex is initialized based on current observation then information-propagation is performed to compute audio-based and vision-based semantic knowledge vectors. The vision-based knowledge vector is stored in memory M, and the audio-based knowledge vector is used to attend to the encoded memory $M_e$. The output is a graph embedding which serves as a spatial- and semantic-aware representation for policy optimization. The vision encoder $f_e^v$ encodes the visual observation data, comprising RGB and depth images from the perspective of the agent. The audio encoder $f_e^b$ encodes the binaural audio observation data heard by the agent into a two-channel log-mel spectrogram, with a third channel encoding the generalized cross-correlation with phase transform between the two channels.

The policy network 414 implements a transformer-based architecture that stores observation data in memory M. At each time step, each visual observation, $e_t^v=f_e^v(v_t)$ and $e_t^{v\text{-}gen}=GEN^v(f_c^v(v_t))$, is encoded to save in the memory. The memory also stores the pose p of the agent, which is defined by the location and orientation (x, y, θ) of the agent with respect to a starting pose $p_0$ in the current episode, and $a_{t-1}$, a previously executed action. Thus, the encoded observation stored in memory is $e_t^0=[e_t^v, e_t^{v\text{-}gen}, p_t, a_{t-1}]$. The model stores these observation encodings up to time t in memory as $M=\{e_t^0: i=\max\{0, t-S_M\}, \ldots, t\}$, where $S_M$ is the memory size. The transformer uses the memory M stored so far in the episode and encodes these visual observation embeddings with a self-attention mechanism to compute the encoded memory $M_e=Encoder(M)$. Then, using the audio observation embeddings, a decoder network (e.g., the decoder 418) attends to all cells in $M_e$ to calculate the state representation $s_t=Decoder(M_e, e_t^{b\text{-}gen}, 1_t^b)$, where $e_t^{b\text{-}gen}=GEN^b(f_c^b(b_t))$. Using this attention mechanism, the agent captures long-term spatio-temporal associations between the acoustic-driven goal prediction and the visual observation data. Moreover, preserves the most relevant information to reach the goal is preserved by conditioning visual-semantic embeddings stored in $M_e$ on audio-semantic embeddings computed using current audio observation. The actor-critic network 420 uses $s_t$ to predict the value of the state and action distribution. Finally, the action sampler 422 takes a next-action $a_t$ from the action distribution.

To train the vision classification model $f_c^v$, a dataset is using, for example, Matterport3D houses (e.g., 85 houses comprising 82,828 images, each corresponding to a location and rotation angle in a SoundSpaces simulator). Each image has 128×128 resolution and 4 modalities: RGB image, depth image, object semantic image, and region semantic image. The binary cross-entropy loss is for optimizing the vision classification model and training the vision classification model as a standard multi-label classifier. To train the audio classification model $f_c^b$, the SoundSpaces simulator is to generate 1.5M spectrograms using different source and receiver positions, each corresponding to a sounding object in one of the 85 Matterport3D houses. Detecting sounding objects is treated as a multi-class classification problem and the audio classification model is optimized using cross-entropy loss. The vision classification model takes an RGB image as input, and the audio classification model takes a sound clip (e.g., a 1-second sound clip represented as two 65×26 binaural spectrograms) as input. In an example, both vision and audio classification models are trained using a ResNet-18 architecture, pre-trained on ImageNet. The vision classification model predicts a score for 21 objects and 24 regions, and the audio classification model predicts a score for 21 objects. These models are pre-trained before and are frozen (i.e., fixed) during policy optimization. While Matterport3D is provided as an example for training these classification models, the aspects of the system 400 may also be trained on other house environments that provide semantic labels of objects and regions in houses.

A simplified ResNet-18 architecture is used to train the location predictor $f_{loc}^b$, (e.g., jointly with the policy network 414. In an example, the location predictor is optimized using a mean squared error loss and updated with the same frequency as the policy network 414. The policy network 414 is trained using a decentralized distributed proximal policy optimization (DD-PPO), which includes a value network loss, policy network loss, and an entropy loss to encourage exploration. A two-stage training procedure is used for effectively training the vision networks ($f_e^v$, GEN$^v$). In a first stage, the SMT policy is trained without attention by setting the memory size $s_M=1$ and storing the latest observation embeddings. In a second stage, the memory size is set to $s_M=150$, and the parameters of the vision networks are frozen. The input to the vision encoder $f_e^v$ is 64×64 RGB, and depth images cropped from the center.

As described above, the system 400 implements a framework for leveraging knowledge-enhanced scene priors, in the form of object and region semantics, for the semantic audio-visual navigation task. Performance improvements over strong baselines in multiple unseen contexts are achieved, particularly in conditions where the agent needs to find novel sounding objects. The knowledge graph 432 for training models, a curated visual dataset, and a new task definition are also provided, each configured for developing and assessing model generalization performance in unseen environments.

FIG. 4C generally illustrates steps of an example method 440 for using knowledge-driven scene priors for semantic audio-visual embodied navigation and training according to the present disclosure. The method 440 may be implemented by the system 400 and/or any other system described herein, such as the systems described in FIGS. 1-3. At 442, the method 440 receives a visual observation and an audio observation (e.g., vision data 406 and audio data 408) from an observation of an environment. For example, the vision data and the audio data are respectively received at a vision network and an audio network. For example, the audio observation includes audio data from (1) previously seen indoor environments (e.g., houses) and previously heard sounds, (2) previously seen houses and unheard (i.e., not previously heard) sounds, (3) unseen (i.e., not previously seen) houses and previously heard sounds, and (4) unseen houses and unheard sounds.

At 444, a vision encoder ($f_e^v$) encodes the visual observation. At 446, a vision model (e.g., a pre-trained vision model ($f_c^v$)) predicts classification scores ($c_t^v$) for objects and regions within the visual observation. As described above in more detail, the vision classification model $f_c^v$ is trained to predict a score for each object $o \in \mathcal{O}$ and region $r \in \mathcal{R}$ as a likelihood that the observation corresponds to region r. At 448, a vision-based graph encoder network (GEN$^v$) calculates visual-semantic feature embeddings as described above.

At 450, an audio encoder ($f_e^b$) encodes the audio observation. The encoded visual observation, the visual-semantic feature embeddings, and the encoded audio observation (and, in some examples, a pose $p_t$ of the agent and a previous action $a_{t-1}$) are stored in memory M as visual information, along with a pose $p_t$ of the agent and a previous action $a_{t-1}$.

At 452, a location predictor ($f_{loc}^b$) predicts (i) a distance and direction $l_t$ of the sounding object from the agent and (ii) a direct-to-reverberant-ratio $\delta_t$. At 454, an audio model (e.g., a pre-trained audio model $f_c^b$) predicts classification scores $c_t^b$ for objects based on the audio observation as described above in more detail. As described above in more detail, the audio classification model $f_c^b$ is trained to predict a score for each object $o \in \mathcal{O}$ as a likelihood that o produced the acoustic observation. The current prediction may be aggregated with a previous prediction.

At 456, an audio-based graph encoder network (GEN$^b$) calculates audio-semantic feature embeddings based a $_t$ least in part on outputs of the location predictor ($f_{loc}^b$) and the pre-trained audio model ($f_c^b$) as described above in more detail. For example, GEN$^b$ incorporates a knowledge graph that captures spatial relationships between object-to-object, object-to-region, and region-to-region.

At 458, outputs of the vision network are encoded (e.g., using an encoder of a policy network) as encoded visual information that associates the visual information with acoustic information. At 460, a device (e.g., an agent navigating an environment) decodes the encoded visual information based a $_t$ least in part on outputs of the audio network (including, for example, outputs of GEN$^b$), which indicate relationships between objects, between regions, and between objects and regions as described above in more detail. The agent may correspond to an actual agent or a simulation of an agent. At 462, the method 440 (e.g., the agent) predicts and outputs, based on the decoded visual information, a state representation $s_t$ containing spatial and semantic cues associated with the observation of the environment.

FIGS. 5-11 depict example systems and devices that may implement systems and methods according to the present disclosure. FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. For example, the computer-controlled machine 500 corresponds to the agent described above. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In some embodiments, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes classifier 514. Classifier 514 may be configured to classify input signals x into one or more labels using a machine-learning (ML) algorithm, such as a neural network described above. Classifier 514 is configured to be parametrized by parameters, such as those described above (e.g., parameter $\theta$). Parameters $\theta$ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
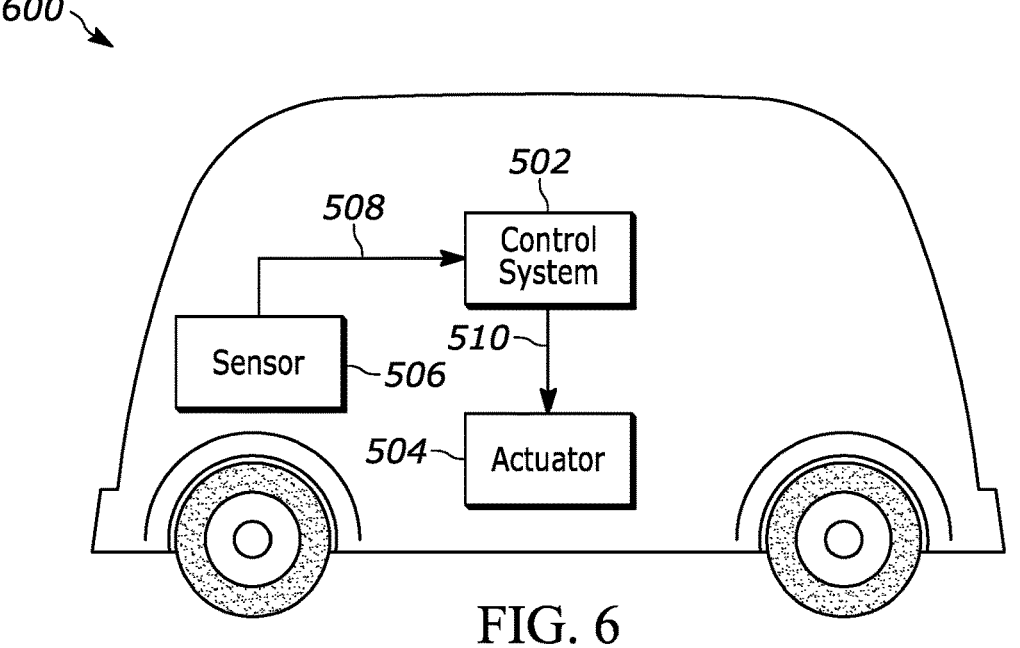

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

FIG. 8 depicts a schematic diagram of control system 502 configured to control power tool 800, such as a power drill or driver, that has an at least partially autonomous mode.

Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of controlling navigation of a device in an environment using machine learning (ML) models, the method comprising, using one or more processing devices:
   receiving visual and audio observation data of the environment as sensed by the device;
   determining classification scores for objects and regions in the environment based on the visual and audio observation data;
   encoding visual information based on the classification scores;
   determining (i) a distance and direction of a sounding object from the device based on the audio observation data and (ii) a direct-to-reverberant ratio (DRR) of an impulse sounding response between the sounding object and the device;
   determining audio-semantic feature embeddings based at least in part on the classification scores, the determined distance and direction of the sounding object from the device, and the DRR, wherein the audio-semantic feature embeddings indicate spatial relationships between objects in the environment, between regions in the environment, and between objects and regions in the environment;
   determining and outputting, based on the encoded visual information and the audio-semantic feature embeddings, a state representation corresponding to a state of the device within the environment; and
   controlling operation of the device based on the state representation.

2. The method of claim 1, wherein determining the audio-semantic feature embeddings includes determining the audio-semantic feature embeddings using a first graph encoder network.

3. The method of claim 2, wherein the first graph encoder network determines the audio-semantic feature embeddings using a first knowledge graph, and wherein vertices in the first knowledge graph correspond to objects or regions in the environment and edges between respective pairs of vertices correspond to relationships between the respective pairs of vertices.

4. The method of claim 3, further comprising determining visual-semantic feature embeddings based at least in part on the classification scores, wherein determining the visual-semantic feature embeddings further indicate spatial relationships between objects in the environment, between regions in the environment, and between objects and regions in the environment.

5. The method of claim 4, wherein determining the visual-semantic feature embeddings includes determining the visual-semantic feature embeddings using a second graph encoder network.

6. The method of claim 5, further comprising encoding the visual information based on an output of the second graph encoder network and an output of an audio encoder.

7. The method of claim 1, wherein determining the classification scores for objects and regions in the environment based on the visual and audio observation data includes (i) determining visual classification scores using a pre-trained vision model and (ii) determining audio classification scores using a pre-trained audio model.

8. The method of claim 1, further comprising providing, during training of the ML model, visual and audio data corresponding to (i) previously seen indoor environments and previously heard sounds, (ii) previously seen indoor environments and unheard sounds, (iii) unseen houses and previously heard sounds, and (iv) unseen houses and unheard sounds.

9. A system for controlling navigation of a device in an environment using machine learning (ML) models, the system comprising:
   sensors configured to receive visual and audio observation data of the environment;
   a vision network configured to determine visual classification scores for objects and regions in the environment based on the visual observation data;
   a location predictor configured to determine (i) a distance and direction of a sounding object from the device based on the audio observation data and (ii) a directto-reverberant ratio (DRR) of an impulse sounding response between the sounding object and the device;

an audio network configured to (i) determine audio classification scores for objects and regions in the environment based on the audio observation data and (ii) determine audio-semantic feature embeddings based at least in part on the visual classification scores, the determined distance and direction of the sounding object from the device, and the DRR, wherein the audio-semantic feature embeddings indicate spatial relationships between objects in the environment, between regions in the environment, and between objects and regions in the environment;

a policy network configured to (i) encode visual information based on the visual classification scores and (ii) determine and output, based on the encoded visual information and the audio-semantic feature embeddings, a state representation corresponding to a state of the device within the environment; and one or more processing devices configured to control operation of the device based on the state representation.

10. The system of claim 9, wherein the audio network includes a first graph encoder network configured to determine the audio-semantic feature embeddings using a first knowledge graph, and wherein vertices in the first knowledge graph correspond to objects or regions in the environment and edges between respective pairs of vertices correspond to relationships between the respective pairs of vertices.

11. The system of claim 10, wherein the vision network includes a second graph encoder network configured to determine visual-semantic feature embeddings based at least in part on the visual classification scores, and wherein the policy network includes an encoder configured to encode the visual information based on an output of the second graph encoder network and an output of an audio encoder.

12. The system of claim 9, wherein the vision network and the audio network are configured to respectively implement a pre-trained vision model and a pre-trained audio model to determine the visual and audio classification scores, and wherein the pre-trained vision model and the pre-trained audio model are configured to receive, during training, visual and audio data corresponding to (i) previously seen indoor environments and previously heard sounds, (ii) previously seen indoor environments and unheard sounds, (iii) unseen houses and previously heard sounds, and (iv) unseen houses and unheard sounds.

13. A computing device configured to control navigation of a device in an environment using machine learning (ML) models, the computing device including a processing device configured to execute instructions stored in memory to:

receive visual and audio observation data of the environment as sensed by the device;

determine classification scores for objects and regions in the environment based on the visual and audio observation data;

encode visual information based on the classification scores;

determine (i) a distance and direction of a sounding object from the device based on the audio observation data and (ii) a direct-to-reverberant ratio (DRR) of an impulse sounding response between the sounding object and the device;

determine audio-semantic feature embeddings based at least in part on the classification scores, the determined distance and direction of the sounding object from the device, and the DRR, wherein the audio-semantic feature embeddings indicate spatial relationships between objects in the environment, between regions in the environment, and between objects and regions in the environment;

determine and output, based on the encoded visual information and the audio-semantic feature embeddings, a state representation corresponding to a state of the device within the environment; and control operation of the device based on the state representation.

14. The computing device of claim 13, wherein the processing device is further configured to execute the instructions to determine the audio-semantic feature embeddings using a first graph encoder network that includes a first knowledge graph, and wherein vertices in the first knowledge graph correspond to objects or regions in the environment and edges between respective pairs of vertices correspond to relationships between the respective pairs of vertices.

15. The computing device of claim 14, wherein the processing device is further configured to execute the instructions to determine visual-semantic feature embeddings using a second graph encoder network and encode the visual information based on an output of the second graph encoder network and an output of an audio encoder.

16. The computing device of claim 13, wherein the processing device is further configured to implement a pre-trained vision model and a pre-trained audio model to determine visual and audio classification scores, and wherein the pre-trained vision model and the pre-trained audio model receive, during training, visual and audio data corresponding to (i) previously seen indoor environments and previously heard sounds, (ii) previously seen indoor environments and unheard sounds, (iii) unseen houses and previously heard sounds, and (iv) unseen houses and unheard sounds.

* * * * *